US010664844B2

(12) United States Patent
Narayan et al.

(10) Patent No.: US 10,664,844 B2
(45) Date of Patent: *May 26, 2020

(54) UNIQUE CODE FOR TOKEN VERIFICATION

(71) Applicant: VISA INTERNATIONAL SERVICE ASSOCIATION, San Francisco, CA (US)

(72) Inventors: Prasanna L. Narayan, San Ramon, CA (US); Phillip Kumnick, Phoenix, AZ (US); Madhu Vasu, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 5 days.

This patent is subject to a terminal disclaimer.

(21) Appl. No.: 15/471,711

(22) Filed: Mar. 28, 2017

(65) Prior Publication Data

US 2017/0200165 A1 Jul. 13, 2017

Related U.S. Application Data

(63) Continuation of application No. 15/368,353, filed on Dec. 2, 2016.

(Continued)

(51) Int. Cl.
*G06Q 20/40* (2012.01)
*H04L 29/06* (2006.01)
(Continued)

(52) U.S. Cl.
CPC ........ *G06Q 20/4018* (2013.01); *G06Q 20/02* (2013.01); *G06Q 20/12* (2013.01);
(Continued)

(58) Field of Classification Search
CPC ... H04L 63/08; H04L 63/0807; H04L 63/083; H04L 63/0838; H04L 63/0846;
(Continued)

(56) References Cited

U.S. PATENT DOCUMENTS

| 5,280,527 A | 1/1994 | Gullman |
| 5,613,012 A | 3/1997 | Hoffman |

(Continued)

FOREIGN PATENT DOCUMENTS

| EP | 1028401 A2 | 8/2000 |
| EP | 2156397 A1 | 2/2010 |

(Continued)

OTHER PUBLICATIONS

PCT International Search Report dated Mar. 23, 2017 in re Application No. PCT/US2016/064817 filed Dec. 2, 2016, 16 pages.

(Continued)

*Primary Examiner* — Zachary A. Davis
(74) *Attorney, Agent, or Firm* — Kilpatrick Townsend & Stockton LLP

(57) ABSTRACT

A method for tokenizing credentials is disclosed. In addition to a token, a verification value can be provided for each interaction. The verification value can be generated based at least in part on a dynamic data element. The dynamic data element may be kept secret, while the verification value can be distributed for use during an interaction. When the verification value is used, it can be validated by re-creating the verification value based at least on the stored dynamic data element.

19 Claims, 10 Drawing Sheets

Related U.S. Application Data

(60) Provisional application No. 62/263,393, filed on Dec. 4, 2015.

(51) Int. Cl.
*G06Q 20/02* (2012.01)
*G06Q 20/12* (2012.01)
*G06Q 20/38* (2012.01)
*G07C 9/30* (2020.01)
*H04L 9/32* (2006.01)
*G07C 9/00* (2020.01)

(52) U.S. Cl.
CPC ....... *G06Q 20/385* (2013.01); *G06Q 20/3821* (2013.01); *G06Q 20/405* (2013.01); *G06Q 20/4014* (2013.01); *G07C 9/00174* (2013.01); *G07C 9/30* (2020.01); *H04L 9/3297* (2013.01); *H04L 63/062* (2013.01); *H04L 63/0807* (2013.01); *H04L 63/0838* (2013.01); *H04L 63/0846* (2013.01); *H04L 63/0892* (2013.01); *H04L 63/10* (2013.01); *H04L 63/107* (2013.01); *H04L 2209/56* (2013.01); *H04L 2463/121* (2013.01)

(58) Field of Classification Search
CPC . H04L 63/0876; H04L 63/0892; H04L 63/10; H04L 63/107; H04L 2463/121; H04L 9/32; H04L 9/321; H04L 9/3213; H04L 9/3297; G06F 21/31; G06F 21/33; G06F 21/335; G06F 2221/2141; G06Q 20/40; G06Q 20/401; G06Q 20/4018; G06Q 20/3821; G07C 9/00174; G07C 2009/0023; G07C 2009/00238; G07C 2009/00246; G07C 2009/00253; G07C 2009/00412; G07C 2009/0042; G07C 2009/00428; G07C 2009/00476
See application file for complete search history.

(56) References Cited

U.S. PATENT DOCUMENTS

| | | | |
|---|---|---|---|
| 5,781,438 A | 7/1998 | Lee | |
| 5,883,810 A | 3/1999 | Franklin | |
| 5,930,767 A | 7/1999 | Reber | |
| 5,953,420 A * | 9/1999 | Matyas, Jr. | H04L 9/0844 380/285 |
| 5,953,710 A | 9/1999 | Fleming | |
| 5,956,699 A | 9/1999 | Wong | |
| 6,000,832 A | 12/1999 | Franklin | |
| 6,014,635 A | 1/2000 | Harris | |
| 6,044,360 A | 3/2000 | Picciallo | |
| 6,163,771 A | 12/2000 | Walker | |
| 6,227,447 B1 | 5/2001 | Campisano | |
| 6,236,981 B1 | 5/2001 | Hill | |
| 6,267,292 B1 | 7/2001 | Walker | |
| 6,327,578 B1 | 12/2001 | Linehan | |
| 6,341,724 B2 | 1/2002 | Campisano | |
| 6,385,596 B1 | 5/2002 | Wiser | |
| 6,422,462 B1 | 7/2002 | Cohen | |
| 6,425,523 B1 | 7/2002 | Shem Ur | |
| 6,453,301 B1 | 9/2002 | Niwa | |
| 6,592,044 B1 | 7/2003 | Wong | |
| 6,625,135 B1 * | 9/2003 | Johnson | H04W 16/18 370/332 |
| 6,636,833 B1 | 10/2003 | Flitcroft | |
| 6,694,431 B1 * | 2/2004 | Binding | H04L 63/0428 713/152 |
| 6,748,367 B1 | 6/2004 | Lee | |
| 6,805,287 B2 | 10/2004 | Bishop | |
| 6,879,965 B2 | 4/2005 | Fung | |
| 6,891,953 B1 | 5/2005 | DeMello | |
| 6,901,387 B2 | 5/2005 | Wells | |
| 6,931,382 B2 | 8/2005 | Laage | |
| 6,938,019 B1 | 8/2005 | Uzo | |
| 6,941,285 B2 | 9/2005 | Sarcanin | |
| 6,980,670 B1 | 12/2005 | Hoffman | |
| 6,990,470 B2 | 1/2006 | Hogan | |
| 6,991,157 B2 | 1/2006 | Bishop | |
| 6,993,652 B2 * | 1/2006 | Medvinsky | G06Q 20/3678 380/279 |
| 7,051,929 B2 | 5/2006 | Li | |
| 7,069,249 B2 | 6/2006 | Stolfo | |
| 7,103,576 B2 | 9/2006 | Mann, III | |
| 7,113,930 B2 | 9/2006 | Eccles | |
| 7,136,835 B1 | 11/2006 | Flitcroft | |
| 7,177,835 B1 | 2/2007 | Walker | |
| 7,177,848 B2 | 2/2007 | Hogan | |
| 7,194,437 B1 | 3/2007 | Britto | |
| 7,209,561 B1 | 4/2007 | Shankar et al. | |
| 7,246,231 B2 * | 7/2007 | Tariq | H04L 63/0435 713/160 |
| 7,264,154 B2 | 9/2007 | Harris | |
| 7,287,692 B1 | 10/2007 | Patel | |
| 7,290,141 B2 * | 10/2007 | Sengodan | H04L 63/08 380/252 |
| 7,292,999 B2 | 11/2007 | Hobson | |
| 7,350,230 B2 | 3/2008 | Forrest | |
| 7,353,382 B2 | 4/2008 | Labrou | |
| 7,379,919 B2 | 5/2008 | Hogan | |
| RE40,444 E | 7/2008 | Linehan | |
| 7,415,443 B2 | 8/2008 | Hobson | |
| 7,444,676 B1 | 10/2008 | Asghari-Kamrani | |
| 7,469,151 B2 | 12/2008 | Khan | |
| 7,548,889 B2 | 6/2009 | Bhambri | |
| 7,567,934 B2 | 7/2009 | Flitcroft | |
| 7,567,936 B1 | 7/2009 | Peckover | |
| 7,571,139 B1 | 8/2009 | Giordano | |
| 7,571,142 B1 | 8/2009 | Flitcroft | |
| 7,580,898 B2 | 8/2009 | Brown | |
| 7,584,153 B2 | 9/2009 | Brown | |
| 7,593,896 B1 | 9/2009 | Flitcroft | |
| 7,606,560 B2 | 10/2009 | Labrou | |
| 7,627,531 B2 | 12/2009 | Breck | |
| 7,627,895 B2 | 12/2009 | Gifford | |
| 7,650,314 B1 | 1/2010 | Saunders | |
| 7,685,037 B2 | 3/2010 | Reiners | |
| 7,702,578 B2 | 4/2010 | Fung | |
| 7,707,120 B2 | 4/2010 | Dominguez | |
| 7,712,655 B2 | 5/2010 | Wong | |
| 7,734,527 B2 | 6/2010 | Uzo | |
| 7,753,265 B2 | 7/2010 | Harris | |
| 7,761,374 B2 * | 7/2010 | Sahota | G06Q 20/10 705/39 |
| 7,770,789 B2 | 8/2010 | Oder, II | |
| 7,784,685 B1 | 8/2010 | Hopkins, III | |
| 7,793,851 B2 | 9/2010 | Mullen | |
| 7,801,826 B2 | 9/2010 | Labrou | |
| 7,805,376 B2 | 9/2010 | Smith | |
| 7,805,378 B2 | 9/2010 | Berardi | |
| 7,818,264 B2 | 10/2010 | Hammad | |
| 7,828,220 B2 | 11/2010 | Mullen | |
| 7,835,960 B2 | 11/2010 | Breck | |
| 7,841,523 B2 | 11/2010 | Oder, II | |
| 7,841,539 B2 | 11/2010 | Hewton | |
| 7,844,550 B2 | 11/2010 | Walker | |
| 7,848,980 B2 | 12/2010 | Carlson | |
| 7,849,020 B2 | 12/2010 | Johnson | |
| 7,853,529 B1 | 12/2010 | Walker | |
| 7,853,995 B2 | 12/2010 | Chow | |
| 7,865,414 B2 | 1/2011 | Fung | |
| 7,873,579 B2 | 1/2011 | Hobson | |
| 7,873,580 B2 | 1/2011 | Hobson | |
| 7,890,393 B2 | 2/2011 | Talbert | |
| 7,891,563 B2 | 2/2011 | Oder, II | |
| 7,896,238 B2 | 3/2011 | Fein | |
| 7,908,216 B1 | 3/2011 | Davis et al. | |
| 7,922,082 B2 | 4/2011 | Muscato | |
| 7,931,195 B2 | 4/2011 | Mullen | |
| 7,937,324 B2 | 5/2011 | Patterson | |
| 7,938,318 B2 | 5/2011 | Fein | |

(56) References Cited

U.S. PATENT DOCUMENTS

| | | |
|---|---|---|
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Hogg et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,531,637 B2 * | 12/2016 | Sharp ............ G06F 21/31 |
| 9,646,303 B2 | 5/2017 | Karpenko |
| 9,680,942 B2 | 6/2017 | Dimmick |
| 9,792,782 B1 * | 10/2017 | Basu ............ G07F 19/203 |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |

(56) References Cited

U.S. PATENT DOCUMENTS

| | | |
|---|---|---|
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0132813 A1 * | 5/2009 | Schibuk ............ G06Q 20/223 713/158 |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0274721 A1 | 10/2010 | Hammad |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0010552 A1 | 1/2011 | Hoornaert et al. |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindselee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II et al. |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |

(56) References Cited

U.S. PATENT DOCUMENTS

| | | |
|---|---|---|
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0204794 A1* | 8/2013 | Sahota .............. G06Q 20/10 705/67 |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0232079 A1 | 9/2013 | Lindelsee et al. |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0006775 A1* | 1/2014 | Dixon .............. H04L 63/123 713/155 |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |

(56) References Cited

U.S. PATENT DOCUMENTS

| | | |
|---|---|---|
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Laxminarayanan et al. |
| 2017/0163629 A1 | 6/2017 | Law |
| 2017/0186001 A1 | 6/2017 | Reed et al. |
| 2017/0200156 A1 | 7/2017 | Karpenko |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |
| 2017/0228723 A1 | 8/2017 | Taylor |
| 2017/0236113 A1 | 8/2017 | Chitalia |
| 2017/0293914 A1 | 10/2017 | Girish |
| 2017/0295155 A1 | 10/2017 | Wong et al. |
| 2017/0364903 A1 | 12/2017 | Lopez |
| 2017/0373852 A1 | 12/2017 | Cassin |
| 2018/0006821 A1 | 1/2018 | Kinagi |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |
| 2019/0066069 A1 | 2/2019 | Faith |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

"DCVV Card", Available online at: http://www.oberthur.comjot/OT_dCVV.pdf, Sep. 15, 2014, 2 pages.

"Gemalto Dynamic Code Verification", Available online at: https://www.gemalto.comjbrochures-site/download-site/Documents/fs-dynamic-code-verification.pdf, Oct. 12, 2015, 4 pages.

EP16871667.8 , "Extended European Search Report", dated Jul. 25, 2018, 8 pages.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, et. al, U.S. Appl. No. 16/302,054 (unpublished), "Methods of Distributing Tokens and Managing Token Relationships," filed Nov. 15, 2018.

Dean, et al., U.S. Appl. No. 16/311,144 (unpublished), "Encryption Key Exhange Process Using Access Device," filed Dec. 18, 2018.

Purves, et al., U.S. Appl. No. 16/287,244 (unpublished), "Payment Channel Returning Limited Use Proxy Dynamic Value," filed Feb. 27, 2019.

U.S. Appl. No. 15/368,353 , "Final Office Action", dated Oct. 3, 2019, 23 pages.

SG11201803495V , "Written Opinion", dated Nov. 19, 2019, 8 pages.

* cited by examiner

UNIQUE CODE FOR TOKEN VERIFICATION

CROSS REFERENCE TO RELATED APPLICATIONS

This application is a continuation of U.S. patent application Ser. No. 15/368,353, filed Dec. 2, 2016, which is a non-provisional application of and claims the benefit of the filing date of U.S. Provisional Application No. 62/263,393, filed on Dec. 4, 2015, each of which is herein incorporated by reference in its entirety for all purposes.

BACKGROUND

Systems for providing dynamic values involve shared secrets, which cause predictability problems. For example, a conventional system includes an authentication server and a user device. A user of the user device can attempt to access an account managed by the authentication server. The user device generates a dynamic value based on a shared secret. The user device then sends the dynamic value to the authentication server. The authentication server uses the same shared secret to validate that the dynamic value is authentic. If the dynamic value is successfully authenticated, the authentication server allows the user device to access the account.

This shared secret is problematic, as it is either static, or dynamic but not random. As a result, the shared secret is at risk of being deduced or predicted by an outsider. Additionally, the authentication server has the burden of distributing a shared secret to each user device, as well as storing a shared secret for each user device. Similarly, before being able to participate in the system, each user device in the system is configured to incorporate the shared secret and utilize the dynamic value.

SUMMARY

Embodiments of the invention address these and other problems individually and collectively. For example, embodiments enable a central server computer to generate a verification value and then provide the verification value to a user device (or resource provider computer). The user device can then submit the verification value during a transaction, and the central server computer can validate that the submitted verification value is authentic.

As a result, embodiments do not require that the user device and central server computer have a shared secret. This means that shared secrets do not have to be distributed, and the user device does not have to be configured to store or use a shared secret. Additionally, the verification value can be random.

Embodiments of the invention also allow the verification value to be generated based on a dynamic data element. The central server computer can provide the verification value to the user device, and can forgo storing the verification value. Instead, the central server computer can store the dynamic data element. When the verification value is used for a transaction, the central server computer can validate the verification value by regenerating the verification value based on the stored dynamic data element. Forgoing storage of the verification value improves security, as the verification value is less vulnerable to hacking and compromise. In some embodiments, the dynamic data element can be smaller than the verification value. Accordingly, storing the dynamic data element instead of the verification value reduces the central server computer's data storage burden.

One embodiment of the invention is directed to a method. The method comprises receiving, by a second computer, a request for a verification value associated with a transaction from a first computer. The request includes a token and a token requestor identifier. The method further includes generating a dynamic data element and storing a record. The record can include the dynamic data element, the token, and the token requestor identifier. The method also includes generating a first verification value based on the dynamic data element and the token, providing the first verification value to the first computer, and receiving a request to validate the first verification value from a third computer. The request includes the first verification value, the token, and the token requestor identifier. The method also comprises identifying the record including the dynamic data element based on the token and the token requestor identifier, and generating a second verification value based on the dynamic data element, the token, and the token requestor identifier. The second computer determines that the second verification value matches the first verification value, and provides a value credential associated with the token to the third computer.

Another embodiment of the invention is directed to a second computer configured to perform the above-described method.

Another embodiment of the invention is directed to a method comprising receiving, by a third computer, an authorization request message for a transaction from a first computer. The authorization request message includes a token, a token requestor identifier, and a first verification value. The method also includes sending the token, the token requestor identifier, and the first verification value to a second computer. The second computer identifies a dynamic data element based on the token and the token requestor identifier, and generates a second verification value based on the dynamic data element, the token, and the token requestor identifier. The second computer also determines that the second verification value matches the first verification value. The method further includes receiving a value credential associated with the token from the second computer, and sending the authorization request message and the value credential to an authorizing entity computer. The authorizing entity computer then authorizes the transaction based on the value credential.

Another embodiment of the invention is directed to a third computer configured to perform the above-described method.

Further details regarding embodiments of the invention can be found in the Detailed Description and the Figures.

DETAILED DESCRIPTION

Figure 1:
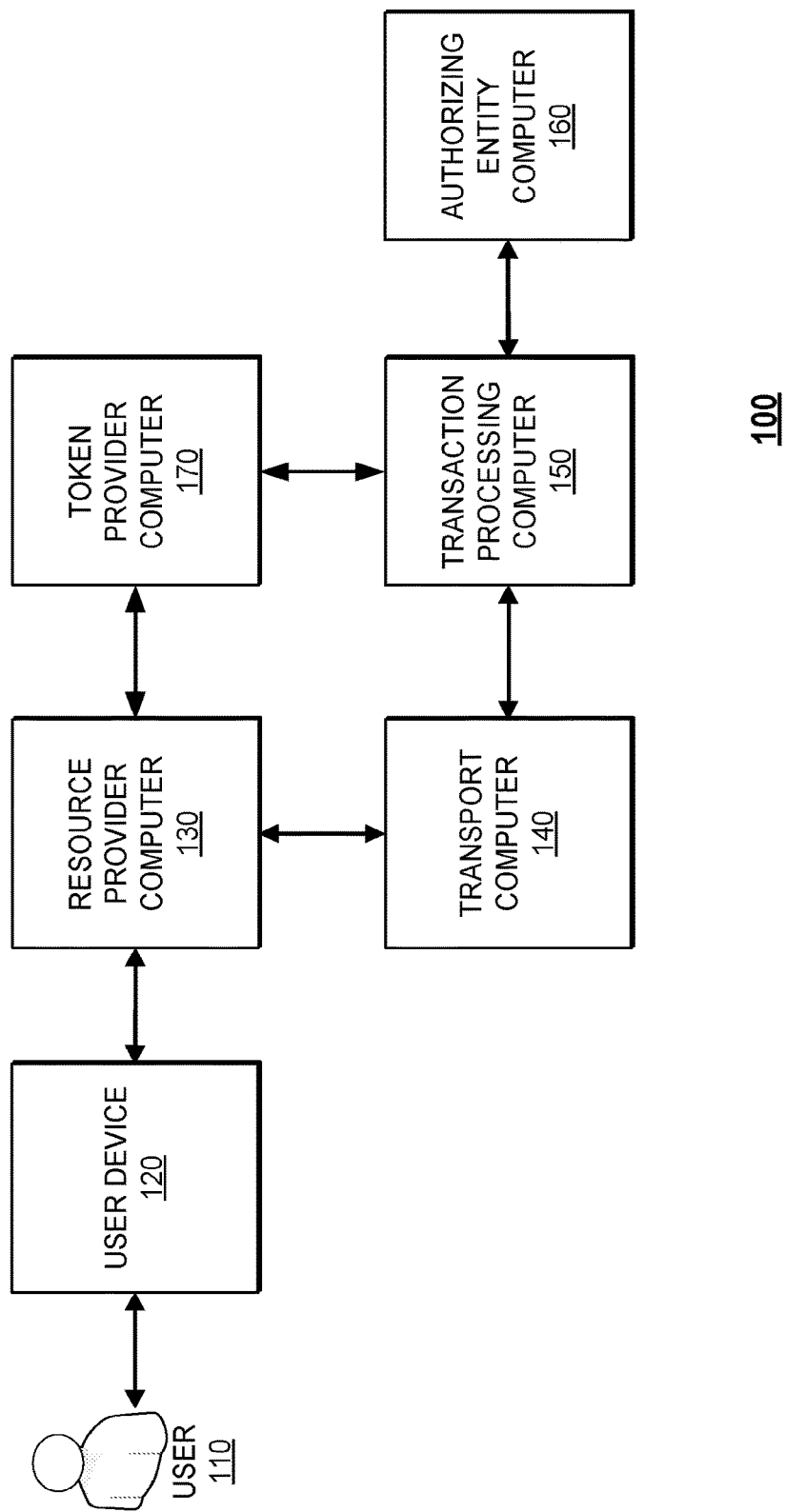
FIG. 1 shows a block diagram of a system according to an embodiment of the invention.

Embodiments of the present invention are directed to using a verification value to authenticate the use of a token for a transaction. For example, an access token can represent a set of access credentials, but the access token may only be accepted for a transaction if accompanied by an authentic verification value. Similarly, a payment token can represent a set of payment credentials, but the payment token may only be accepted for a transaction if accompanied by an authentic verification value.

A central token provider can generate a verification value for a certain payment token and token requestor. Embodiments allow the verification value to be generated based on the token, a dynamic data element, a token expiration date, a token requestor ID, and/or any other suitable information.

The input dynamic data element can also be generated by the token provider. The dynamic data element can be a unique hexadecimal value, a random number, a counter value, a timestamp, and/or any other dynamic information. As a result, the verification value can have a dynamic input, such that the verification value is also a dynamic value.

While the verification value can be provided to a token requestor for use in a transaction, the dynamic data element is not shared. Instead it can be stored and kept private by the token provider. The algorithm used to generate the dynamic data element can also be kept secret, as can the algorithm for generating the verification value. As a result, the token provider may be the only entity capable of generating an authentic dynamic data element and/or verification value. For example, even if a fraudster intercepts a verification value, the fraudster cannot determine how to produce another authentic verification value. The fraudster may not even be able to determine the format or size of the dynamic data element, let alone generate a valid dynamic data element.

Further, the verification value is not stored by the token provider. However, the token provider can still authenticate a verification value using the stored dynamic data element. For example, a merchant may submit a payment token, a token requestor ID, a verification value, and/or any other suitable information for a transaction. The token provider can then identify a stored dynamic data element associated with the received verification value (e.g., based on the payment token, token requestor ID, etc.). Then, the token provider may regenerate the verification value based on the identified dynamic data element, the received payment token, the received token requestor ID, and/or other suitable information. If the regenerated verification value matches the received verification value, the received verification value can be considered valid, and the transaction can proceed. For example, the token provider may detokenize the payment token and provide the associated payment credentials.

Embodiments of the invention also allow token domain restrictions to be placed on a specific use of the payment token via the verification value and the dynamic data element. One or more token domain controls may be associated with the verification value and indicated in a stored record that is associated with the verification value (e.g., a record that includes the dynamic data element). As a result, when the verification value is being validated, the token domain controls can also be identified and checked. If the attempted transaction does not adhere to the assigned token domain controls, the transaction can be denied. Thus, the approved scenarios for which the payment token is valid can be further specified and controlled.

Embodiments of the invention provide a number of advantages. For example, in embodiments of the invention, the use of a verification value for authenticating a payment token can be implemented without having to store the verification value. For example, instead of storing the verification value, the token provider computer can store a dynamic data element used as input for the verification value. As a result, sensitive information that can be used to overcome security barriers (e.g., the verification value) is not stored, but an incoming verification value can still be validated by re-creating the verification value with the stored dynamic data element. Thus, security is improved because sensitive information is not stored or vulnerable.

Further, embodiments of the invention decrease the amount of storage capacity needed at a central token provider. This can be seen by contrasting with alternative embodiments where a cryptogram can be generated for each transaction by encrypting transaction-related information. In this case, the cryptogram can be submitted with the token for a transaction, and the cryptogram can be validated by regenerating the cryptogram with the same input information and encryption keys. However, this involves storing a cryptogram and/or multiple encryption keys for each token transaction, as well as passing a cryptogram in authorization request messages. In some embodiments, a cryptogram may be a large string of data, such as a string of 40 characters. Storing cryptograms and/or specific keys for each transaction can create a need for a large storage database. In contrast, embodiments of the invention allow the central token provider to store as little as a dynamic data element for each transaction. A dynamic data element can be 1-5 characters, or any other suitable length. Additionally, encryption keys can be derived from a master key (e.g., instead of storing each key). Thus, the amount of stored data can be reduced.

Embodiments of the invention further improve security through an improved verification value. The dynamic data element and verification value can be generated at a central token provider computer. The verification value then can be provided to a token requestor. When the verification value is used for a transaction, the token provider computer may be asked to validate the verification value. Accordingly, the same entity (e.g., the token provider computer) can both generate the verification value and validate the verification. As a result, the token provider computer may not have to share a secret with any other entities.

In contrast, in some conventional systems, a user device may generate the verification value, and the token provider computer may validate the verification value. For this to work, the user device and verification value may keep a shared secret, such as a shared encryption key and/or a shared algorithm for generating a verification value. Shared information is typically, to some extent, static and/or predictable. For example, a user device may use a dynamic data element such as a time of day or counter to generate the verification value. The token provider computer can then re-create and validate the verification value using the same time of day or counter. While this creates a dynamic verification value, the verification value is not random. A fraudster might, in theory, be able to determine the shared secret or pattern, and then be able to create an authentic verification value.

As mentioned above, embodiments of the invention do not require the use of shared secrets or patterns. For example, the dynamic data element that is used as an input for generating the verification value in embodiments of the invention can be completely random, as this value need not be distributed to various devices in a distributed system.

Another advantage is that the algorithm and/or encryption keys used to generate the verification value can also be changed, random, or otherwise unpredictable. For example, a verification value can be made dynamic and unpredictable by changing one or more factors, including the input information (e.g., using a dynamic data element as input), the algorithm for generating the verification value, and/or the encryption keys used in the algorithm. Embodiments of the invention allow one or more of these factors to be dynamic and unpredictable. For example, in some embodiments, static information can be used as input data, but the algorithm can vary from transaction to transaction. In other embodiments, the encryption keys can vary, while the algorithm and input data can be static or predictable. In other embodiments, two or more of the input data, algorithm, and keys can be dynamic. Thus, embodiments provide a number of new techniques for generating an unpredictable verification value.

Embodiments of the invention advantageously provide all of this functionality without requiring merchants or acquirers to make any system changes. For example, the verification value can be formatted as a Card Verification Value 2 (CVV2) or Card Verification Value (CVV) value, such that it can be included in an existing field in an authorization request message. Thus, the merchant can accept and send the verification value without adjusting data fields. In contrast, other forms of payment token control often involve updates to each entity in a transaction network. For example, a token cryptogram may be too large (e.g., too many characters) to enter into a merchant checkout page or to include in an authorization request message, so system changes and updates may be needed to accommodate a token cryptogram. It is difficult and inefficient to change systemic protocols and structures at this level, as many different entities are involved.

Prior to discussing specific embodiments of the invention, some terms may be described in detail.

A "credential" may be any suitable information that serves as reliable evidence of worth, ownership, identity, or authority. A credential may be a string of numbers, letters, or any other suitable characters that may be present or contained in any object or document that can serve as confirmation.

A "value credential" may be information associated with worth. Examples of a value credential include payment credentials, information needed to obtain a promotional offer, etc.

"Payment credentials" may include any suitable information associated with an account (e.g., a payment account and/or payment device associated with the account). Such information may be directly related to the account or may be derived from information related to the account. Examples of payment credentials may include a PAN (primary account number or "account number"), user name, and an expiration date. An example of a PAN is a 16-digit number, such as "4147 0900 0000 1234." In some embodiments, payment credentials can also include verification values such as CVV (card verification value), dCVV (dynamic card verification value), CVV2 (card verification value 2), CVC3 card verification values, dCVV2 (dynamic card verification value 2), and/or other verification values described below.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include a system that services payment tokens. In some embodiments, a token provider can facilitate requesting, determining (e.g., generating) and/or issuing tokens, as well as maintaining an established mapping of tokens to primary account numbers (PANs) in a repository (e.g. token vault). A token provider may include or be in communication with a token vault where the generated tokens are stored. The token provider may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token provider. For example, payment networks and issuers or their agents may become the token provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters may be established as part of token issuance by the token service provider that may allow for enforcing appropriate usage of the token in payment transactions. The parameters may include token domain controls which may control or restrict the token domains for which a token can be used. For example, the token domain controls may restrict the use of the token with particular presentment modes, such as contactless or e-commerce presentment modes. In some embodiments, the token domain controls may restrict the use of the token at a particular merchant that can be uniquely identified. Some exemplary token domain controls may require the verification of the presence of a token cryptogram or a verification value that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token requestor" may include an entity that requests a token. A token requestor may also request verification data (e.g., a verification value) associated with a token. Example token requestors can include a mobile device, a user computer, a resource provider computer, an enabler computer, and/or any other suitable entity. A token requestor may be identified by a "token requestor identifier." A token requestor identifier may be a set of letters, numbers, or any other suitable characters for identifying a token requestor. A token requestor identifier may be assigned to the token requestor by a token service system.

A "dynamic data element" may include a value that can vary across different scenarios. For example, a dynamic data element may be a first value for a first transaction, and a second value for a second transaction. A dynamic data element may be one or more numbers, letters, or any other suitable characters. An example of a dynamic data element is a unique code, such as a unique hexadecimal value or a unique cryptographic code. A unique hexadecimal value can be a randomly generated value. Additional examples include a random number, an application transaction counter (ATC), a unique transaction number, a timestamp, a transaction amount, etc. The dynamic data element can include any suitable number of characters, such as 5 digits.

A "verification value" may include information for authentication. For example, a verification value may be associated with a specific token, and a verification value may demonstrate authentic use of a token. A verification value may include one or more numbers, letters, or any other suitable characters. A verification value can be generated dynamically, and thus can be a dynamic value that changes for each token transaction. In some embodiments, a verification value may be valid for a single transaction, or for multiple transactions. In some embodiments, a verification value may be generated based on one or more dynamic inputs and/or one or more static inputs. For example, a verification value can be generated using a dynamic data element, a token, a token expiration date, a token requestor identifier, and/or any other suitable information. An example of a verification value is a dCVV2.

As used herein, a "dynamic card verification value 2" (sometimes referred to as a "device verification value" or a "dCVV2"), may be a changing verification value. A dCVV2 can be an identifier associated with a payment account. For example, a dCVV2 can be a verification value submitted with a payment token or payment credentials of a payment account. In some embodiments, a dCVV2 may be 3, 4, 5 or more characters in length. In some embodiments, a dCVV2 can be generated based on one or more data elements. The inputs for a dCVV2 can include transaction-specific information and transaction-agnostic information. For example, a dCVV2 can be generated using one or more dynamic data elements, payment data (e.g., a token, a token expiry date, etc.), transaction data associated with a current transaction (e.g., a transaction amount, a transaction identifier, an acquirer bank identification number (BIN), a token requestor ID, etc.), one or more cryptographic keys, a cryptogram, a digital signature, a hash value (e.g., based on transaction data), and/or any other suitable information.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

As used herein, a "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), a technology for radio wireless local area networking of devices based on the IEEE 802.11 standards (i.e., WI-FI), a family of wireless broadband communication standards based on the IEEE 802.16 set of standards (i.e., WI-MAX), or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a user device 120 operated by a user 110. The system 100 further comprises a resource provider computer 130, a transport computer 140, a transaction processing computer 150, an authorizing entity computer 160, and a token provider computer 170, each of which may be embodied by one or more computers. All of the computers and devices in the system 100 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocol such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user device 120 may be any suitable device associated with the user 110. In some embodiments, the user device 120 may be a mobile device, a payment device, or a desktop computer.

The user 110 may be able to use the user device 120 to interact with the resource provider computer 130. For example, the user device 120 may be able to access a website or other information associated with the resource provider computer 130. In some embodiments, the user 110 can utilize the user device 120 for purchasing goods and/or services from the resource provider over the internet.

The user device 120 may store or have access to certain types of user information. For example, the user device 120 may store payment credentials such as a PAN, an address, a CVV, and an expiration date. The user device 120 may store personal information such as a name, address, email address, phone number, or any other suitable user 110 identification information. In some embodiments, the user device 120 may also store a payment token. Some or all of this data may be securely stored via hardware (e.g., a secure element) or software (e.g., host card emulation or other encryption techniques). The user device 120 may be able to use payment credentials and/or payment tokens for transactions. For example, the user device 120 may be able to transmit payment credentials and/or payment tokens over-the-air to the resource provider computer 130 during internet transactions and/or in-app transactions. Also, the user device 120 may be able to transmit (e.g., via near-field communication (NFC), a wireless technology standard for exchanging data between devices over short distances using short-wavelength radio waves (i.e., BLUETOOTH), radio frequency (RF), Quick Response (QR) code, etc.) payment credentials and/or payment tokens to an access device (e.g., a POS terminal) during in-person transactions.

The resource provider computer 130 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services.

The resource provider may accept multiple forms of payment and may use multiple tools to conduct different types of transactions. For example, the resource provider may sell goods and/or services via a website, and may accept payments over the Internet. Also, the resource provider may operate a physical store and use an access device for in-person transactions.

Figure 2:
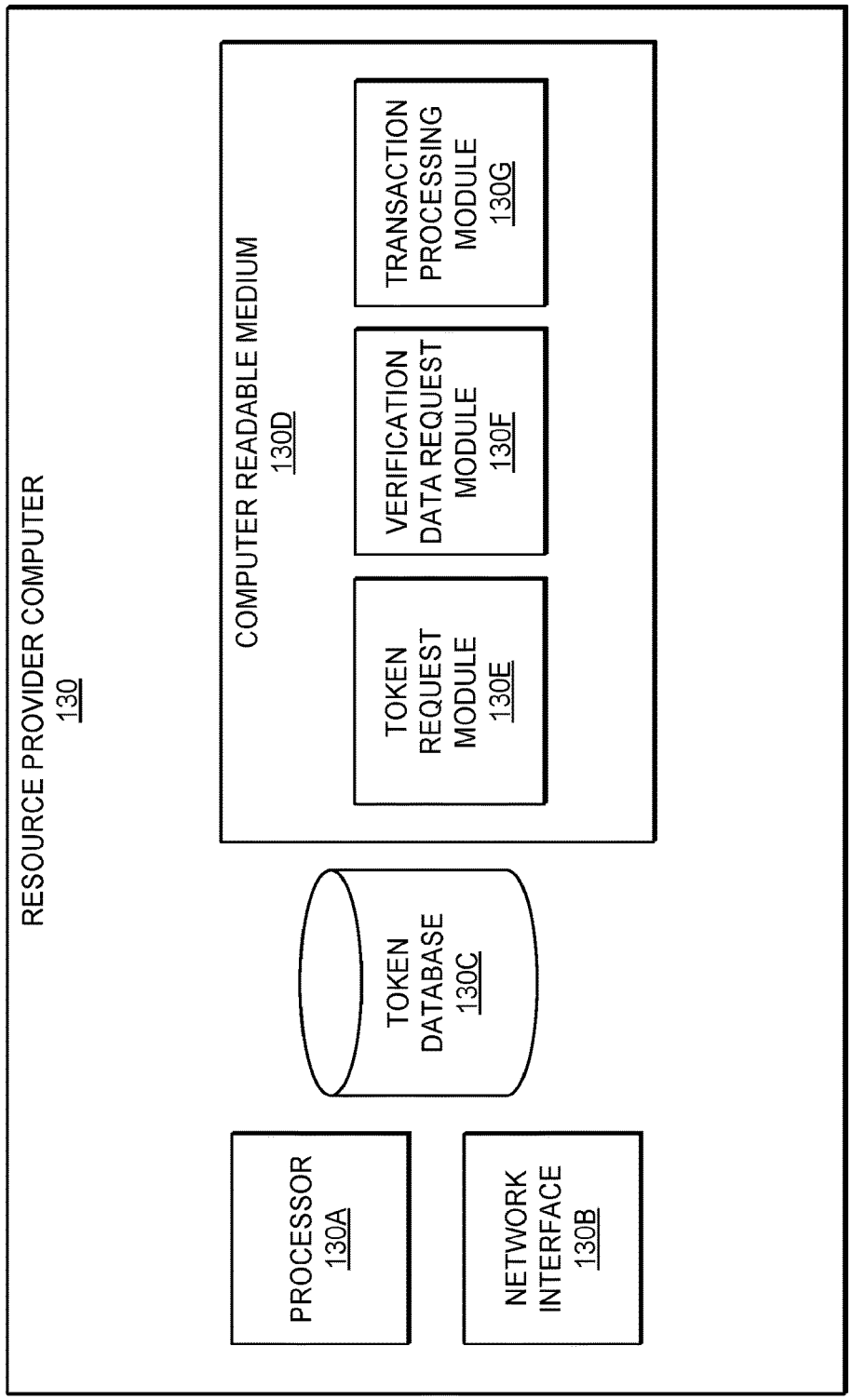
FIG. 2 shows a block diagram of a resource provider computer according to an embodiment of the invention.

An example of the resource provider computer 130, according to some embodiments of the invention, is shown in FIG. 2. The resource provider computer 130 comprises a processor 130A, a network interface 130B, a token database 130C, and a computer readable medium 130D.

The computer readable medium 130D may comprise a token request module 130E, a verification data request module 130F, a transaction processing module 130G, and any other suitable software module. The computer readable medium 130D may also comprise code, executable by the processor 130A for implementing a method comprising sending, by a first computer, to a second computer, a request for a verification value associated with a transaction, the request including a token and a token requestor identifier, wherein the second computer generates a dynamic data element and a first verification value, and wherein the second computer stores a record including the dynamic data element, the token, and the token requestor identifier; receiving the first verification value from the second computer; and sending an authorization request message to a third computer for a transaction, the authorization request message including the first verification value, the token, and the token requestor identifier, and transaction data, wherein the third computer sends the verification value to the second computer, wherein the second computer generates a second verification value based on the dynamic data element, the token, and the token requestor identifier, wherein the second computer determines that the second verification value matches the first verification value, and wherein the second computer provides, to the third computer, a value credential associated with the token.

The token request module 130E may comprise code that causes the processor 130A to obtain a token. For example, the token request module 130E may contain logic that causes the processor 130A to send a token request message to the token provider computer 170. The token request message may include the user's payment credentials, a token requestor ID associated with the resource provider, and any other suitable information. The token request module 130E may also include instructions for associating a received token with the user 110 and storing the received token in the token database 130C.

The verification data request module 130F may comprise code that causes the processor 130A to obtain verification data. For example, the transaction data request module 130F may contain logic that causes the processor 130A to send a verification data request message to the token provider computer 170. The verification data message may include the user's payment token (e.g., stored in the token database 130C), a corresponding token expiration date, a token requestor ID associated with the resource provider, and any other suitable information. In some embodiments, there may be two different token requestor IDs associated with the resource provider. For example, a first token requestor ID may be used for requesting a payment token, while a second token requestor ID may be used for requesting a verification value.

In some embodiments, a verification data request message may include the user's payment credentials in addition to or instead of the payment token. The transaction data request module 130F may also include instructions for requesting verification data (e.g., a verification value) when a transaction has been initiated, and instructions for providing the verification value for inclusion in an authorization request message.

The transaction processing module 130G may comprise code that causes the processor 130A to process transactions. For example, the transaction processing module 130G may contain logic that causes the processor 130A to receive a transaction request from the user 110 for purchasing one or more goods or services. The transaction processing module 130G may include instructions for initiating a transaction authorization process, and for finalizing a transaction so that goods and/or services can be released. The transaction processing module 130G may, in conjunction with the processor 130A, submit an authorization request message including a payment token, a token expiration date, a token requestor ID, a verification value, and/or any other suitable information. The transaction processing module 130G may also include instructions for generating transaction receipts and storing transaction records (e.g., including transaction data, user information, a payment token, a verification value, etc.) in a transaction database.

In some embodiments, the resource provider computer 130 may encrypt the payment token, the token expiration date, the verification value, and/or any other suitable information sent in an authorization request message. For example, the resource provider computer 130 may encrypt the data with a public key associated with the transaction processing computer 150 or the token provider computer 170, which can in turn decrypt the data with a corresponding private key upon receipt of the authorization request message. In other embodiments, a symmetric key shared between two or more of the entities in the system may be used to encrypt and decrypt data and messages. Embodiments allow any other information and messages to be encrypted, such as communications between the resource provider computer 130 and token provider computer 170 related to payment tokens and verification values.

Referring back to FIG. 1, the transport computer 140 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 140 may be more specifically referred to as an acquirer computer.

The transaction processing computer 150 may be disposed between the transport computer 140 and the authorizing entity computer 160. The transaction processing computer 150 may include data processing subsystems, networks, and operations used to support and deliver authorization services, exception file services, and clearing and settlement services. For example, the transaction processing computer 150 may comprise a server coupled to a network interface (e.g., by an external communication interface), and databases of information. The transaction processing computer 150 may be representative of a transaction processing network. An exemplary transaction processing network may include VISANET. Transaction processing networks such as VISANET are able to process credit card transactions, debit card transactions, and other types of commercial transactions. VISANET, in particular, includes a VIP system (Visa Integrated Payments system) which processes authorization requests and a Base II system which performs clearing and settlement services. The transaction processing computer 150 may use any suitable wired or wireless network, including the Internet.

Figure 3:
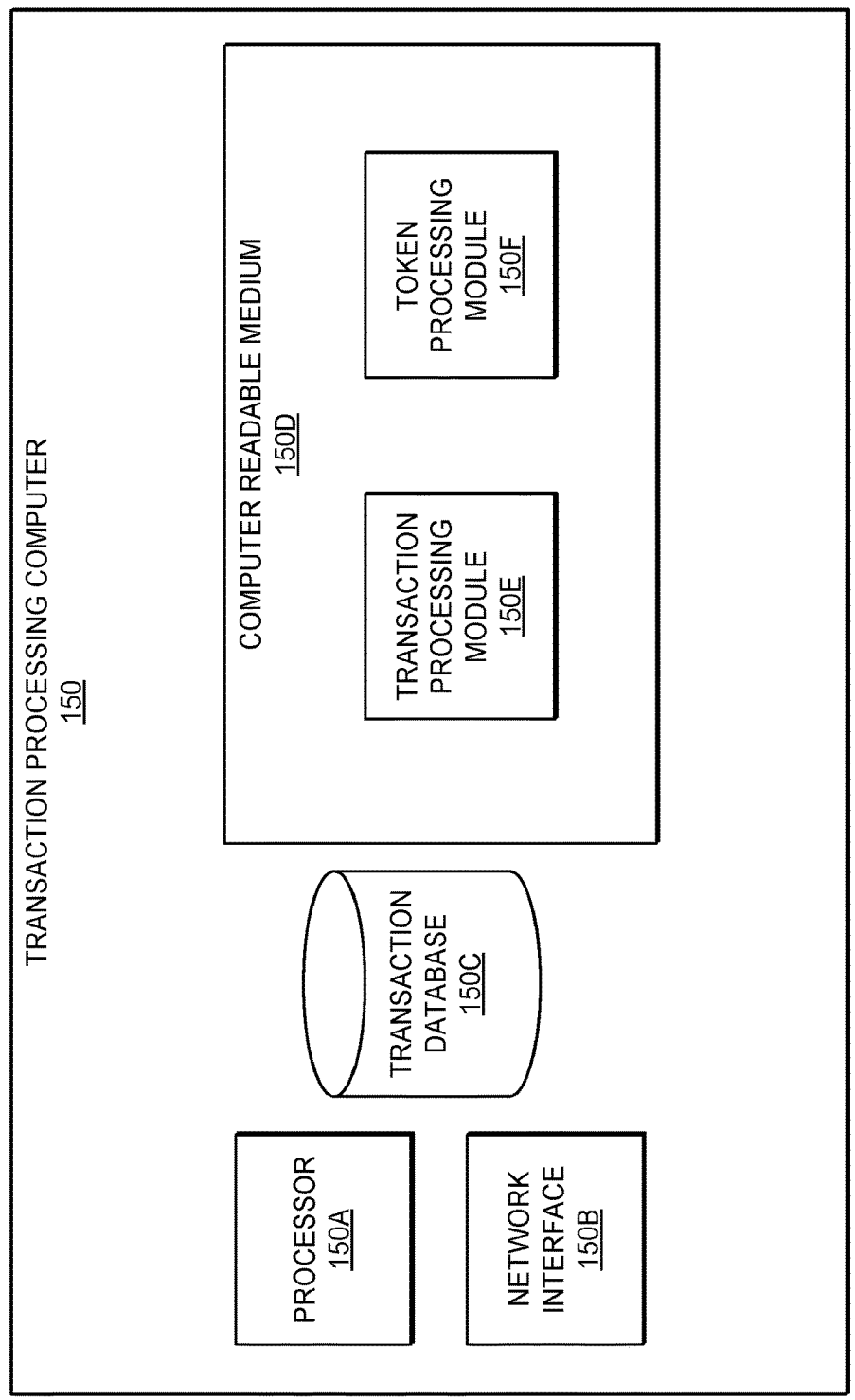
FIG. 3 shows a block diagram of a transaction processing computer according to an embodiment of the invention.

An example of the transaction processing computer 150, according to some embodiments of the invention, is shown in FIG. 3. The transaction processing computer 150 comprises a processor 150A, a network interface 150B, a transaction database 150C, and a computer readable medium 150D.

The computer readable medium 150D may comprise a transaction processing module 150E, a token processing module 150F, and any other suitable software module. The computer readable medium 150D may also comprise code, executable by the processor 150A for implementing a method comprising receiving, by a third computer, from a first computer, an authorization request message for a transaction, the authorization request message including a token, a token requestor identifier, and a first verification value; sending, by the third computer, the token, the token requestor identifier, and the first verification value to a second computer, wherein the second computer identifies a dynamic data element based on the token and the token requestor identifier, wherein the second computer generates a second verification value based on the dynamic data element, the token, and the token requestor identifier, and wherein the second computer determines that the second verification value matches the first verification value; receiving, by the third computer, from the second computer, a value credential associated with the token; and sending, by the third computer, the authorization request message and the value credential to an authorizing entity computer, wherein the authorizing entity computer authorizes the transaction based on the value credential.

The transaction processing module 150E may comprise code that causes the processor 150A to process transactions. For example, the transaction processing module 150E may contain logic that causes the processor 150A to analyze transaction risk, and to forward, authorize, or reject authorization request messages for payment transactions. The transaction processing module 150E may also include instructions for storing transaction records in the transaction database 150C. For example, the transaction database 150C may include a record of each completed transaction that includes transaction details (e.g. items purchased, amount, timestamp, a transaction identifier), resource provider information, user 110 information (e.g. a name, a phone number and/or other contact information, a payment token, an expiration date, etc.), and/or any other suitable information.

The token processing module 150F may comprise code that causes the processor 150A to process tokens. For example, the token processing module 150F may contain logic that causes the processor 150A to detokenize a payment token in an authorization request message. For example, the token processing module 150F may receive a payment token from the transport computer 140 and send the payment token to the tokenization computer 170 in order to request and obtain corresponding payment credentials.

In some embodiments, the token processing module 150F may include instructions for recognizing a payment token in an authorization request message that may be accompanied by a verification value. For example, payment tokens that can be used with a verification value (e.g., instead of a cryptogram) may be flagged, formatted in a distinct way, or otherwise recognizable.

Referring back to FIG. 1, the authorizing entity computer 160 may be associated with an authorizing entity, which may be an entity that authorizes a request. An example of an authorizing entity may be an issuer, which may typically refer to a business entity (e.g., a bank) that maintains an account for a user. An issuer may also issue and manage a payment account associated with the user device 120.

The transaction processing computer 150, the transport computer 140, and the authorizing entity computer 160 may operate suitable routing tables to route authorization request messages and/or authorization response messages using payment credentials, merchant identifiers, or other account identifiers.

The token provider computer 170 may provide tokenization services. For example, the token provider computer 170 may be able to provide a payment token that represents a PAN and/or other payment credentials. For example, a token request message may be sent to the token provider computer 170, and the token provider computer 170 may then generate and/or associate a payment token with payment credentials in the token request message.

In some embodiments, the token provider computer 170 may also provide verification data or any other suitable information. For example, for a certain transaction, the token provider computer 170 may be able to generate a verification value for use with a payment token. The token provider computer 170 may be able to provide such information to the resource provider computer 130, the user device 120, and/or any other suitable entity.

In some embodiments, the token provider computer 170 may be associated with or combined with the transaction processing computer 150, the authorizing entity computer 160, the transport computer 140, or any other suitable entity. For example, in embodiments, tokenization services may be provided by the authorizing entity computer 160, the transaction processing computer 150, the transport computer 140, a third-party service provider, or any other suitable entity. Thus, the token provider computer 170 may be incorporated as a part of another entity in the system 100. In some embodiments, as shown in FIG. 1, the token provider computer 170 may be a separate entity.

Figure 4:
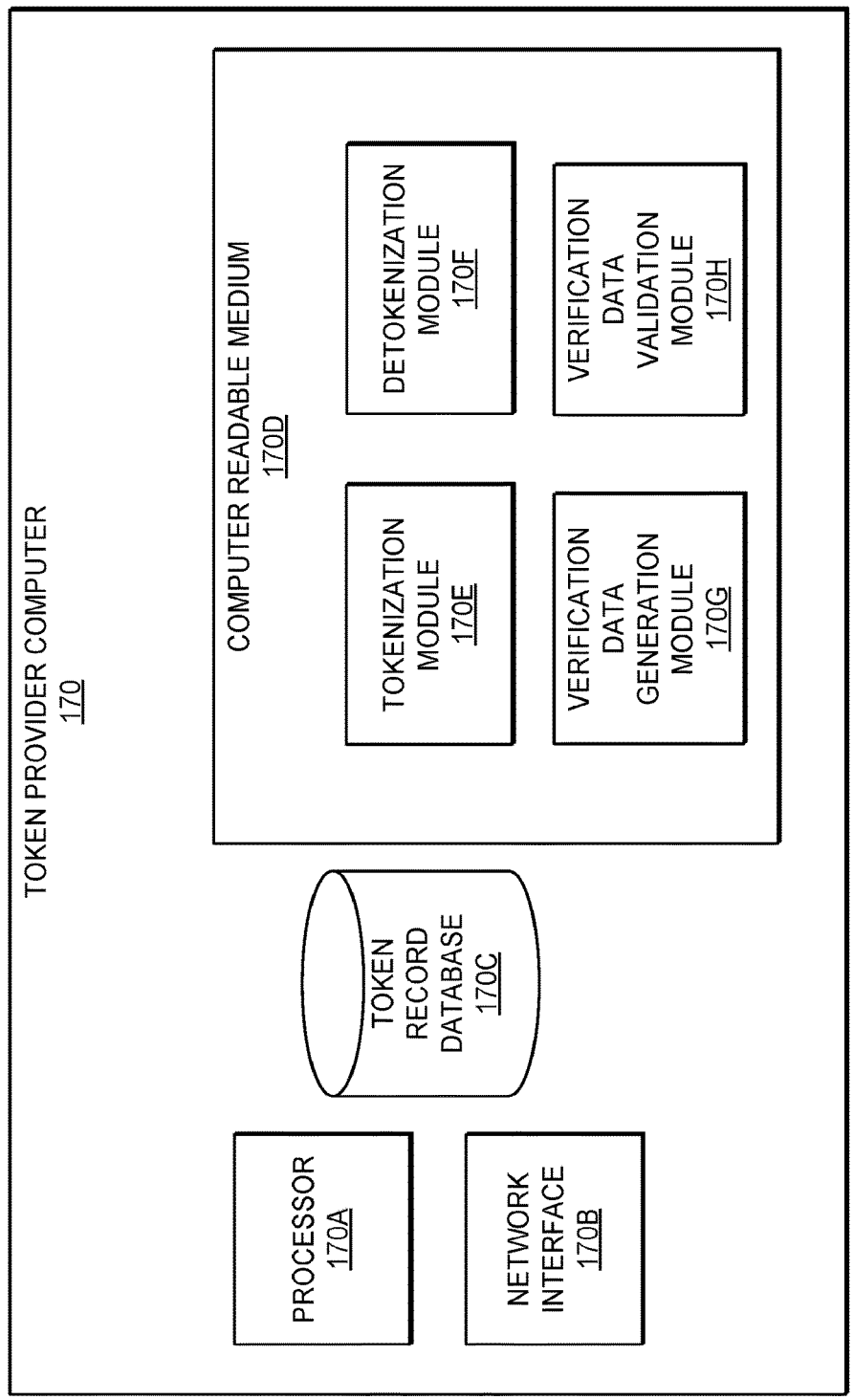
FIG. 4 shows a block diagram of a token provider computer according to an embodiment of the invention.

An example of the token provider computer 170, according to some embodiments of the invention, is shown in FIG. 4. The token provider computer 170 comprises a processor 170A, a network interface 170B, a token record database 170C, and a computer readable medium 170D.

The computer readable medium 170D may comprise a tokenization module 170E, a detokenization module 170F, a verification data generation module 170G, a verification data validation module 170H, and any other suitable software module. The computer readable medium 170D may also comprise code, executable by the processor 170A for implementing a method comprising receiving, by a second computer, from a first computer, a request for a verification value associated with a transaction, the request including a token and a token requestor identifier; generating, by the second computer, a dynamic data element; storing, by the second computer, a record including the dynamic data element, the token, and the token requestor identifier; generating, by the second computer, a first verification value based on the root security value and the token; providing, by the second computer, the first verification value to the first computer; receiving, by the second computer, from a third computer, a request to validate the first verification value, the request including the first verification value, the token, and the token requestor identifier; identifying, by the second computer, the record including the dynamic data element based on the token and the token requestor identifier; generating, by the second computer, a second verification value based on the dynamic data element, the token, and the token requestor identifier; determining, by the second computer, that the second verification value matches the first verification value; and providing, by the second computer, to the third computer, a value credential associated with the token.

The tokenization module 170E may comprise code that causes the processor 170A to provide payment tokens. For example, the tokenization module 170E may contain logic that causes the processor 170A to generate a payment token and/or associate the payment token with a set of payment credentials. A token record may then be stored in the token record database 170C indicating that the payment token is associated with certain set of payment credentials, a certain user 110, and/or a certain resource provider (e.g., via a certain token requestor ID). In some embodiments, a static token (e.g., a token that can be used for multiple transactions) can be provided to a resource provider.

The detokenization module 170F may comprise code that causes the processor 170A to detokenize payment tokens. For example, the detokenization module 170F may contain logic that causes the processor 170A to identify a token record associated with a payment token in the token record database 170C. A set of payment credentials associated with the payment token (as indicated in the token record) can then be identified. In some embodiments, the detokenization module 170F may include instructions to detokenize a payment token in response to a detokenization request message (e.g., received from the transaction processing computer 150 or any other suitable entity). In some embodiments, the detokenization module 170F may include instructions to withhold detokenized payment credentials until a verification value is validated.

The verification data generation module 170G may comprise code that causes the processor 170A to generate verification data for a transaction. For example, the verification data generation module 170G may contain logic that causes the processor 170A to generate a verification value, a dynamic data element, and/or any other suitable verification data. The verification data generation module 170G may also include instructions for providing generated verification data to a requestor.

In some embodiments, a verification value may be cryptographically generated based on a payment token, a token expiration date, a dynamic data element, and/or a token requestor ID. In other embodiments, a verification value may also or alternatively be generated based on an acquirer BIN, a CVV key, one or more additional cryptographic keys, and/or any other suitable information. An example method for generating a verification value is described below with respect to FIGS. 5-8.

In some embodiments, the verification value may not be stored by the token provider computer 170. For example, the token provider computer 170 may store the payment token and/or token expiration date in the token record database 170C, but the token provider computer 170 may not store the verification value in the token record database 170C. In some embodiments, the verification value may be a one-time use value that is valid for one transaction. Accordingly, a unique verification value may be provided for each verification value request.

In some embodiments, a verification value may be formatted for inclusion in an authorization request message. For example, the verification value may be a string of 3, 4, or 5 digits, such that it can be placed in an existing field of an authorization request message. In some embodiments, the verification value can be a dCVV2.

As mentioned above, the verification data generation module 170G may also comprise code that causes the processor 170A to generate a dynamic data element. A dynamic data element may be used as an input when generating the verification value. In some embodiments, the dynamic data element may be different for each verification value and/or transaction. As a result, each verification value generated with a dynamic data element as an input may be unique.

In some embodiments, a dynamic data element may be a unique hexadecimal value (e.g., a 5-digit hex code). In other embodiments, a dynamic data element can be a random number, an ATC, or any other suitable value.

If utilized, an ATC can initially be set by the token provider computer 170 to a predetermined value. Thereafter, the ATC can be incremented with each transaction. Alternately, the ATC may be decremented from its initial predetermined value with each transaction. The ATC may be a value of any suitable length.

In some embodiments, an ATC be used as an input for generating a unique hexadecimal value. For example, a unique hexadecimal value can be created by encrypting and/or hashing an ATC.

In some embodiments, the verification data generation module 170G may include instructions for storing a dynamic data element used for generating a verification value. The dynamic data element may be associated with the token, token expiration date, and/or token requestor ID and stored in the token record database 170C. The stored dynamic data element (along with other information associated with and stored with the dynamic data element) can be referred to as a dynamic data element record or a verification value record (even if the verification value is not stored). This dynamic data element can be included as part of a payment token record.

Accordingly, even if a verification value is not stored, the verification value can be re-created based on the stored dynamic data element and other corresponding information.

In some embodiments, the dynamic data element may not be provided to the token requestor, and may be kept private and secret at the token provider computer 170.

The verification data generation module 170G may include instructions for associating a verification value with token domain controls. As a result, when a token is used for a transaction and the corresponding verification value is being validated, domain controls associated with the verification value can be checked. A verification value can be associated with one or more token domain controls, and these domain controls can be indicated in a dynamic data element record. As a result, the domain controls can be stored without having to store the verification value. When a verification value is used for a transaction, the domain controls can be identified along with the dynamic data element during a validation process for the verification value.

As an example, a verification value can be linked to a certain token requestor ID, thereby indicating that only a certain token requestor can use the verification value and payment token. Additionally, a verification value can be associated with a limited time window (e.g., 1 minute, 10 minutes, 1 hour, etc.) during which a verification value is valid. Accordingly, the verification value can expire after being issued. Additional domain controls include restricting the transaction to a certain transaction mode (e.g., in-person transactions or internet-based transactions), a merchant ID, an acquirer BIN, a maximum transaction amount, an allowed range of transaction locations, and/or any other suitable domain restrictions.

The verification data validation module 170H may comprise code that causes the processor 170A to validate verification data for a transaction. For example, the verification data validation module 170H may contain logic that causes the processor 170A to determine whether a verification value is authentic and being used within assigned token domain controls.

In some embodiments, the token provider computer 170 may receive a payment token, a token expiration date, a verification value, a token requestor ID, and/or any other suitable information that has been submitted in an authorization request message by a resource provider computer 130. The verification data validation module 170H may include instructions for using the received data and/or stored data to validate the use of the token and verification value.

In some embodiments, the verification data validation module 170H may, in conjunction with the processor 170A, identify a dynamic data element associated with the verification value. The dynamic data element may be stored in a dynamic data element record in the token record database 170C, and the dynamic data element may be identified based on a token, a token expiration date, a token requestor ID, an acquirer BIN, and/or any other suitable information that is both stored in the token record database 170C and received via the authorization request message.

In some embodiments, the token provider computer 170 can identify a dynamic data element record based only on the payment token and/or token expiration date. For example, the token provider computer 170 may only issue one verification value at a time for a given payment token. Accordingly, the token provider computer 170 may be able to identify the single valid dynamic data element record based solely on the payment token (e.g., without the token requestor ID, ATC, etc.). In other embodiments, the token provider computer 170 can issue multiple verification values for a given payment token, but each associated dynamic data element record can be uniquely identified based on a payment token and an ATC. In further embodiments, the token requestor ID may be used as a tag for a dynamic data element record, and thus the token requestor ID can be used to identify the dynamic data element record (e.g., in conjunction with the payment token, token expiration date, and/or ATC).

The verification data validation module 170H may then, in conjunction with the processor 170A, regenerate the verification value based on the identified dynamic data element and the received token, the received token expiration date, the received token requestor ID, and/or any other suitable information. The regenerated verification value can be compared with the received verification value. If the values match, the received verification value may be considered authentic and validated.

The verification data validation module 170H may include instructions for checking that any domain controls associated with the verification value (e.g., as indicated in the token record database) are not being violated by the current transaction. As a result, the token provider computer 170 can ensure that the payment token is being used within allowed domains.

Further, the verification data validation module 170H may include instructions to initiate detokenization of a payment token if certain criteria are met. For example, if a verification value is validated and token domain restrictions are met, a set of payment credentials associated with the payment token can be retrieved and provided.

Figure 5:
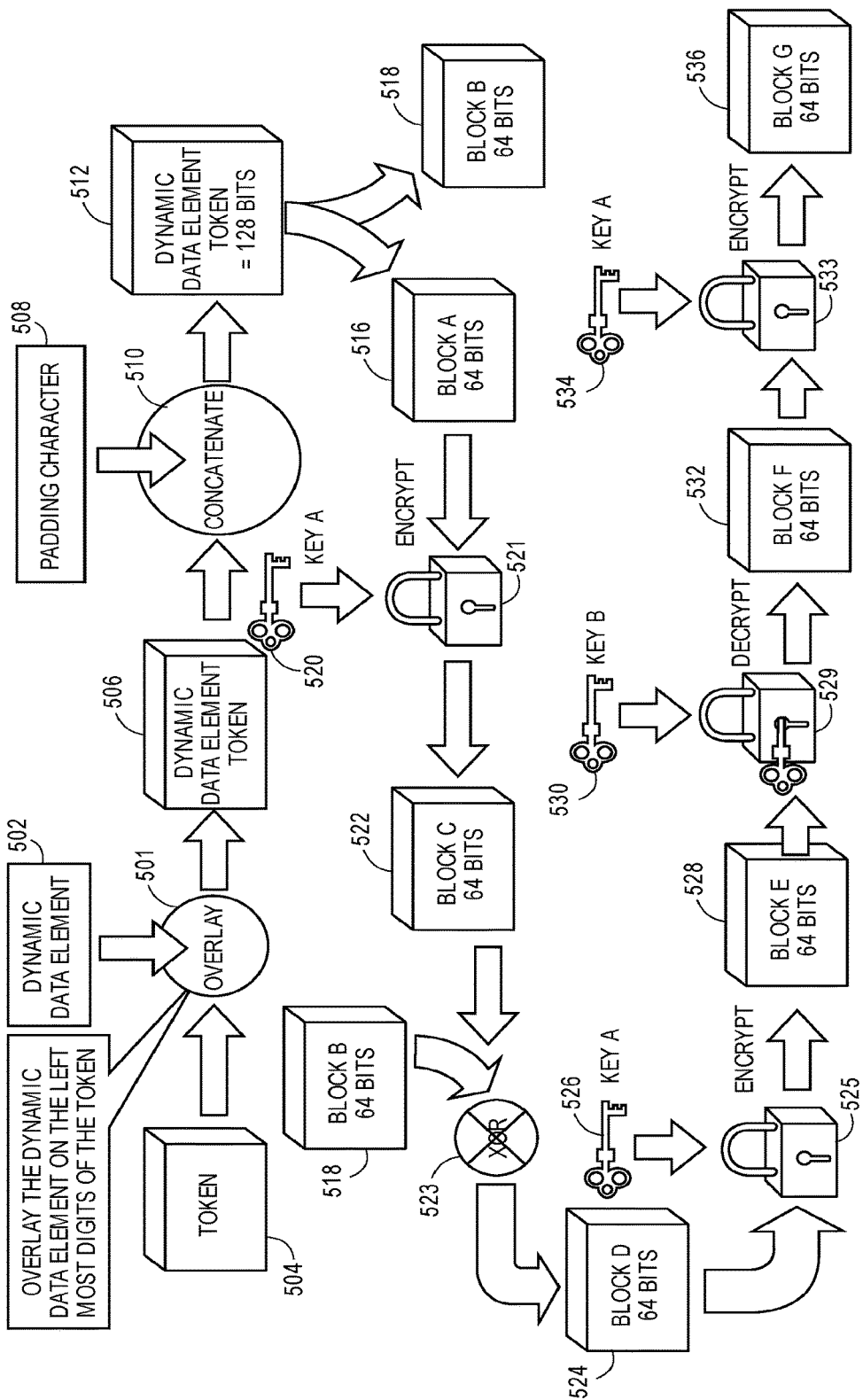
FIG. 5 depicts an example of a method for generating a verification value according to embodiments of the invention.

FIG. 5 depicts an example of a method for generating a verification value according to embodiments of the invention. Other methods may be used in other embodiments of the invention. More specifically, this method can generate a dCVV2 value. Initially, a numeric string of predetermined length can be created. This numeric string can be created by overlaying 501 the dynamic data element 502 over the corresponding leftmost digits of the payment token 504. In some embodiments, multiple dynamic data elements can be overlaid (e.g., a unique hexadecimal value, an ATC, a time of day, a transaction amount, and/or any other suitable value). This numeric string can be concatenated on the right with the token expiration date to produce a concatenated value 506. If necessary, padding characters 508 can be concatenated 510 on the right of the concatenated value 506 to form a numeric string 512 with a predetermined fixed length. In a preferred embodiment, this numeric string 512 can be 128-bits in length, although a numeric string of any suitable length may be used. The padding characters 508 may consist of a stream of 0's, 1's, or any suitable other numeric value. The numeric string 512 can be bisected into two blocks of equal length, Block A 516 and Block B 518. Block A 516 can then be encrypted 521 with a first encryption key 520. The result of the encryption step 521 is Block C 522 of length equal to Block A 516. Block C 522 may then be exclusively OR'ed (XOR) 523 with Block B 518 resulting in Block D 524. Block D 524 can then be encrypted 525 with a second encryption key 526 to produce Block E 528. Block E 528 can then be decrypted 529 using a decryption key 530 to produce Block F 532. Block F 532 may then be encrypted 533 using a fourth encryption key 534 to produce Block G 536.

It will be apparent to one of ordinary still in the art that the first encryption key 520, the second encryption key 526, the third encryption key 530 and the fourth encryption key 534 may take any suitable value. In an embodiment of the present invention, the first encryption key 520, the second encryption key 526, and the fourth encryption key 534 can be equivalent and of a different value from the third encryption key 530. Other permutations of the encryption key values utilized in the methodology of FIG. 5 are within the scope of the present invention.

In a preferred embodiment, the first encryption key 520, the second encryption key 526, the third encryption key 530, and the fourth encryption key 534 take the value of unique keys derived from data existing at the token provider computer 170.

For example, each unique key can be derived from a master derivation key. Further, a CVV key (e.g., a key used to create a CVV based on an account number and/or an expiration date) can also be used to create the verification value.

Figure 6:
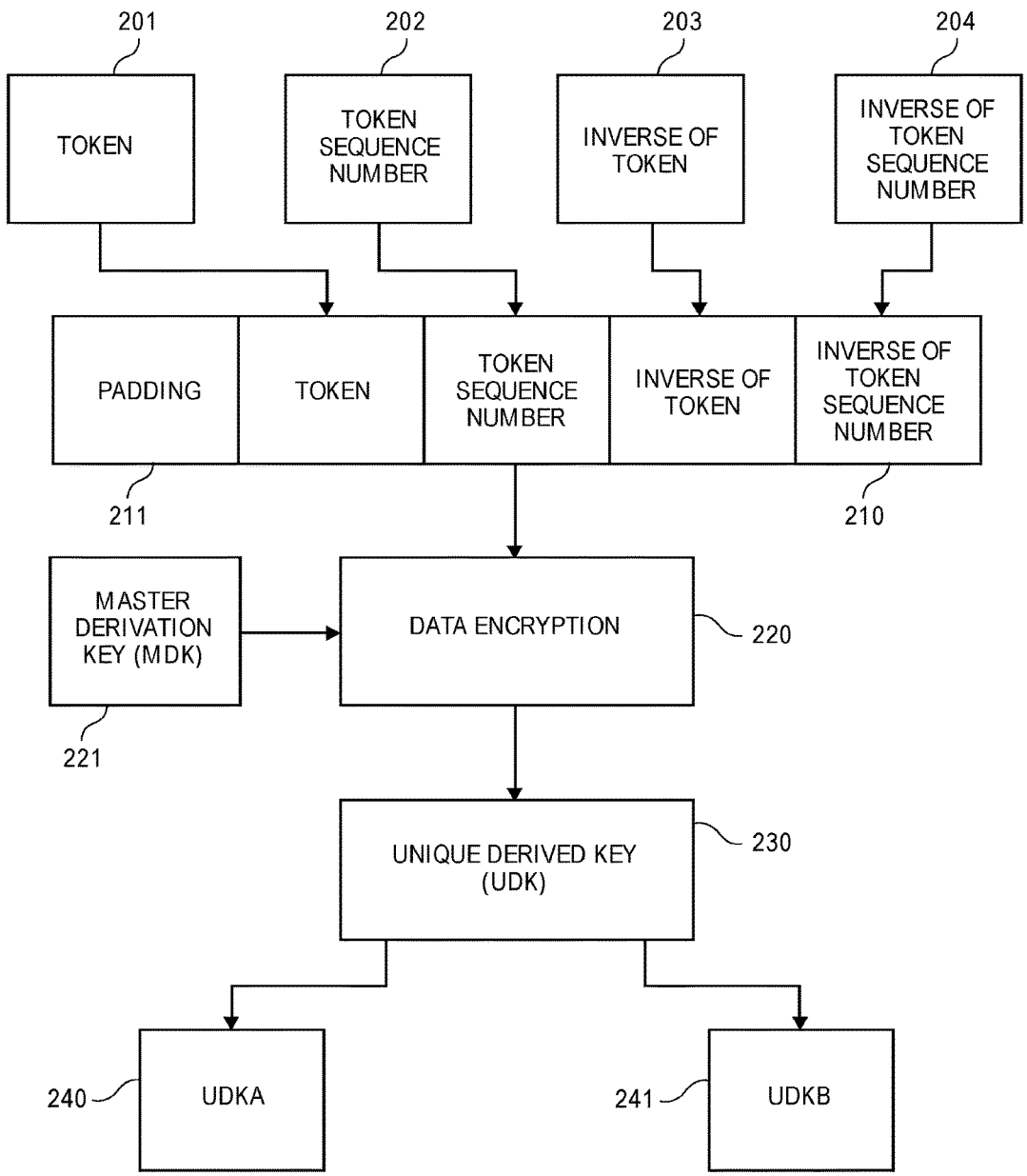
FIG. 6 shows an example of deriving encryption keys according to an embodiment of the invention.

FIG. 6 shows the methodology for deriving two unique keys which can be utilized in the preferred embodiment. The payment token 201, a token sequence number 202, the inverse of the payment token 203, and the inverse of the token sequence number 204 can be concatenated together to create a concatenated value 210. If necessary, the concatenated value 210 may be padded with zeroes, or some other value 211, to create a string of a predetermined fixed length. In a preferred embodiment, the concatenated value 210 may be 128 bits in length, although the concatenated value is not limited to being this length. The concatenated value 210 may then be encrypted 220 using the master derivation key 221 as the encryption key for each encryption stage. The encryption utilized may include any suitable type of encryption methodology. For example, this encryption step may utilize Triple-DES encryption. The value resulting from the encryption step 220 may be a unique derived key or UDK 230. Two additional keys, UDKA 240 and UDKB 241, can be derived from the UDK. The derivation of UDKA 240 and UDKB 241 from the UDK 230 may take any form, including assigning the value of the leftmost half of the UDK 230 to UDKA 240, and assigning the value of the rightmost half of the UDK 230 to UDKB 241. Alternatively, the UDKA 240 may be derived by selecting alternating or other predetermined bit sequences from the UDK 230 while the remaining bits are assigned to UDKB 241. Furthermore, there may be no requirement that UDKA 240 and UDKB 241 are of equal length.

Figure 7:
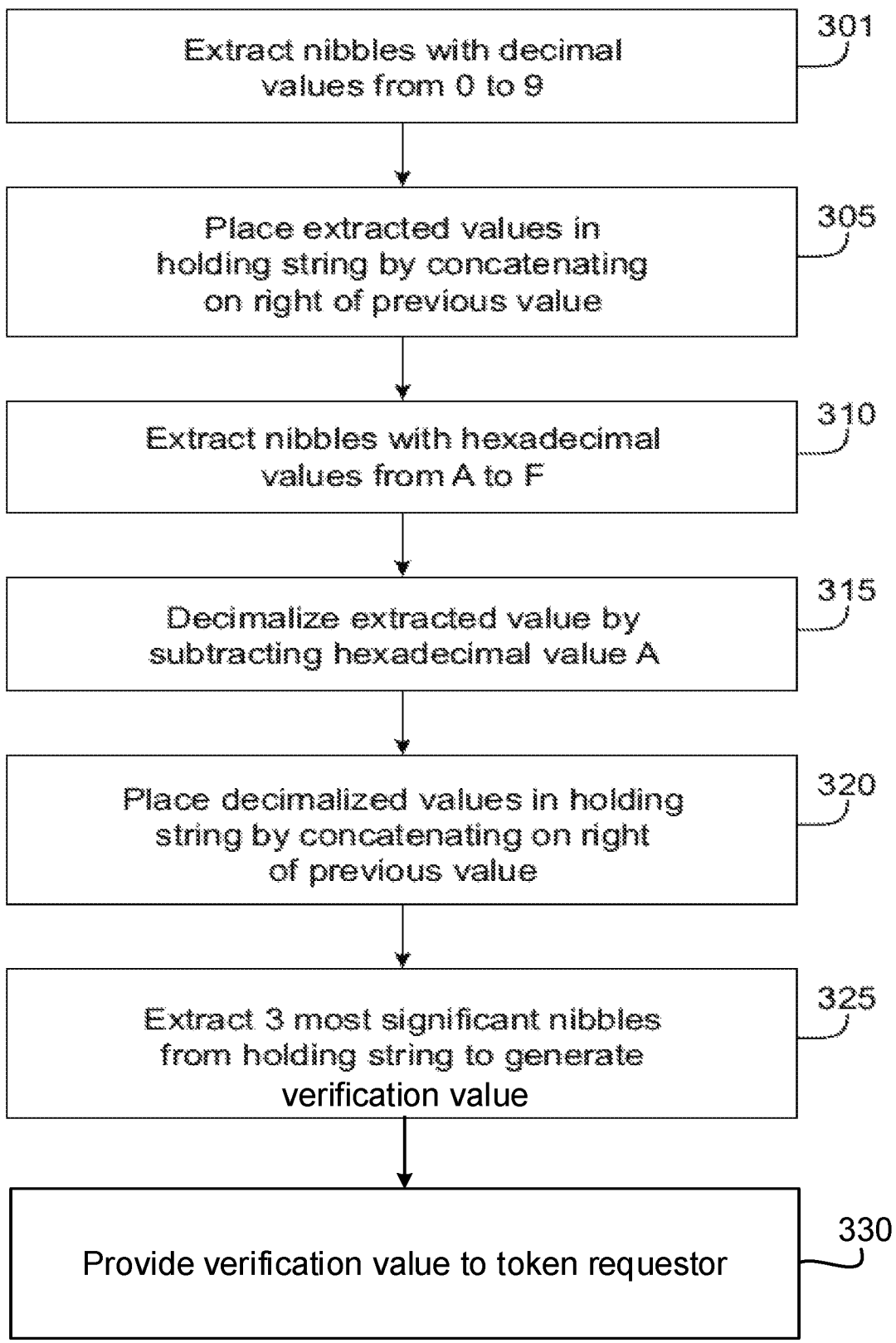
FIG. 7 shows a flow diagram with additional steps for generating a verification value according to an embodiment of the invention.

FIG. 7 describes the further processing for generating the verification value. Each nibble (4-bit grouping) of the value stored in Block G 536 may be subjected to two separate iterative processes to evaluate the value of each nibble. As shown in FIG. 7, beginning with the most significant (i.e. left most) digit of Block G 536 and examining each sequential nibble, if a nibble contains a value ranging from zero to nine, inclusive, that value can be extracted 301 and placed in a new numeric string 305, referred to herein as a holding string, by concatenating the extracted value to the right of the previously extracted value, if any. The result can be that the holding string contains a series of values ranging from zero to nine, inclusive, which may appear from left to right in the holding string in the same sequence in which they appear in Block G 536.

A second evaluation can then be performed again beginning with the most significant digit of Block G 536 and examining each sequential nibble. If a nibble contains a hexadecimal value ranging from ten (A) to fifteen (F), inclusive, that value may be extracted 310. The extracted value can then be decimalized by subtracting the hexadecimal value A from the extracted value resulting in a decimalized value ranging from zero to five 315. This decimalized value can then be concatenated on the right to the right most value of the holding string 320.

Once all nibbles in Block G have been twice examined as described, the three most-significant (i.e. leftmost) nibbles of the holding string may be extracted 325. This 3-digit value can be the verification value for the transaction. Other numbers of bits (e.g., 1 bit, 2 bits, 4 bits, 5 bits, 6 bits, etc.) may be extracted from the twice-examined nibble string to generate the verification value for a transaction. Furthermore, different nibbles, such as the rightmost nibbles, may be used as the verification value for a transaction. The three leftmost nibbles, however, represent a preferred embodiment.

Once generated, the verification value can be provided to the token requestor 330. The verification value can be entered into an existing data field for a transaction, such as a CVV data field or any other suitable data field.

Figure 8:
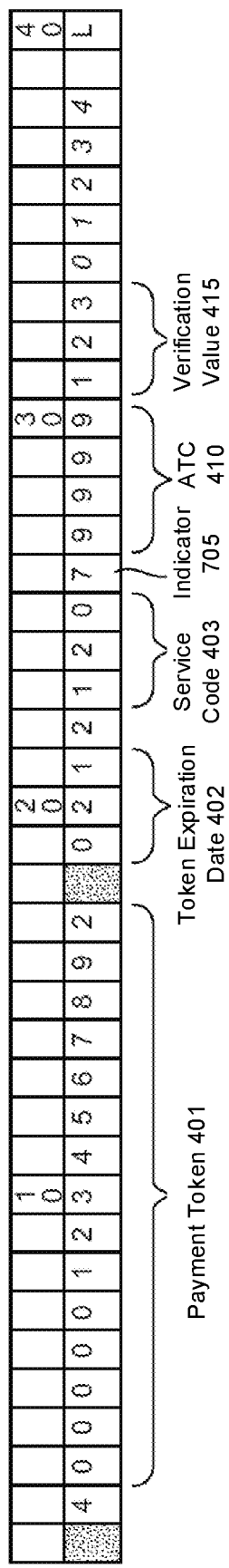
FIG. 8 depicts an exemplary record format for transmitting payment data according to an embodiment of the invention.

FIG. 8 depicts an exemplary record format for transmitting payment data, with the verification value embedded therein, from the resource provider computer to the token provider computer (or from the user device to the resource provider computer). The record format of FIG. 8 can be created by concatenating a payment token 401 with a token expiration date 402 and optionally a service code 403. In a preferred embodiment, the payment token 401 may be 16 digits long, the token expiration date 402 may be four digits long, and the service code 403 may be three digits long. However, the payment token 401, the token expiration date 402, and the service code 403 are not limited to being these lengths. Next, in a field typically reserved for other uses, a value can be placed as an indicator 705 that a verification value has been embedded in this record. The value of this indicator can be known by the resource provider computer (or other token requestor). Next, if being used and provided to the token requestor, an ATC 410 can be placed in the field which may typically be reserved for PIN verification data. Finally, the verification value 415 can be concatenated on the right of the record. The remainder of the record may comprise additional discretionary data.

Figure 9:
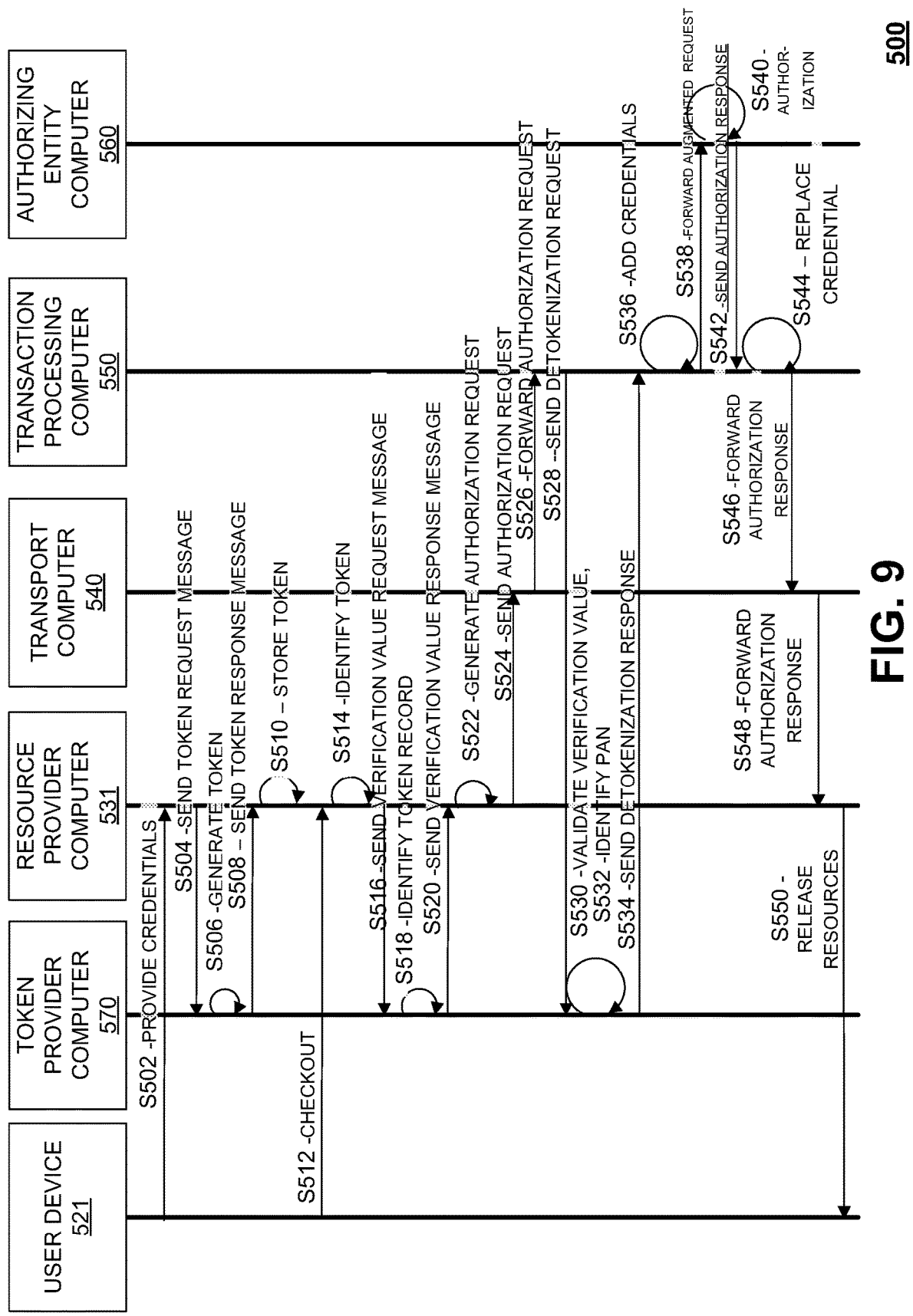
FIG. 9 shows a flow diagram illustrating a method for incorporating a verification value into a transaction process, according to embodiments of the invention.

A method 500 according to embodiments of the invention can be described with respect to FIG. 9. Some elements in other Figures are also referred to. The steps shown in the method 500 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, or a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

At step S502, a user may cause a user device 521 to provide payment credentials to a resource provider computer 531. For example, the user may provide payment credentials for a transaction, or during an account registration process. In other embodiments, the user may provide a payment token.

As an example, the user may input (e.g., manually type) the payment credentials into a checkout webpage of an ecommerce website for an internet transaction. Alternatively, the user may provide payment credentials for an in-person transaction by presenting the user device 521 or a payment card to an access device, such that the user device 521 can transmit the payment credentials over-the-air to the access device.

As described in steps S504-S508, the resource provider computer 531 may obtain a payment token to represent the payment credentials. For example, the resource provider computer 531 may want to store the user's payment information (e.g., for use in future transactions), but may only store payment tokens.

At step S504, the resource provider computer 531 may send a token request message to the token provider computer 570. The token request message may include the user's payment credentials (e.g., a PAN, expiration date, CVV, name, address, etc.). The token request message may also include information associated with the resource provider computer 531, such as a token requestor ID, a merchant ID, a physical address or IP address, an acquirer BIN, and/or any other suitable information.

At step S506, the token provider computer 570 may receive the user's payment credentials from the resource provider computer 531, and the token provider computer 570 may generate a payment token and/or token expiration date for the payment credentials. The token provider computer 570 may store a record of the payment token and token expiration date in a token record database, the record indicating that the payment token is associated with the payment credentials.

In some embodiments, the payment token may be a static token that can be used for multiple transactions. Additionally, in some embodiments, the payment token may only be provided to the resource provider computer 531 and not any other token requestor. In this case, a domain control may be assigned to the payment token specifying that only the resource provider computer 531 is authorized to use the payment token for a transaction. The payment token may only be considered valid if accompanied by an approved token requestor ID or other identifier associated with the resource provider computer 531.

In other embodiments, the payment token may be provided to and used by multiple token requestors. In this case, there may be multiple token requestor IDs associated with the payment token in the token record database.

At step S508, the token provider computer 570 may send a token response message back to the resource provider computer 531. The token response message may include the payment token, token expiration date, token requestor ID, and/or any other suitable information.

At step S510, the resource provider computer 531 may store the payment token and token expiration date (e.g., in a token database or user database). The payment token may be associated with a user account, a user device 521 identifier, or otherwise associated with the user. As a result, the payment token can be identified and utilized for future transactions between the user and resource provider. Thus, the resource provider computer 531 can be a card-on-file merchant that stores a payment token instead of a PAN.

At a later time, the user may desire to initiate a transaction via the user device 521. For example, the user may use the user device 521 to access a merchant website associated with the resource provider computer 531. At step S512, the user may select one or more goods or services at the website, and then initiate a checkout process. Alternatively, the user may approach a merchant POS terminal for an in-person transaction, and the user may present the user device 521 or a payment card for the transaction.

At step S514, the resource provider computer 531 may identify the payment token and/or token expiration date associated with the user and/or user device 521. For example, the payment token may be identified based on a user account, user device identifier, a user name and address, or any other suitable information.

Before submitting an authorization request message for the transaction, the resource provider computer 531 may obtain a verification value for use with the payment token for this transaction. At step S516, the resource provider computer 531 may send a verification value request message to the token provider computer 570. The verification value request message may include the payment token, the token expiration date, and/or any other suitable user information or payment information. The verification value request message may also include information about the resource provider computer 531, such as a token requestor ID, a merchant ID, an IP address or physical address, an acquirer BIN, and/or any other suitable information.

In some embodiments, the token request and verification value request can be combined into one request. For example, if the resource provider computer 531 is not a card-on-file merchant, it may not store the user's payment token, and thus may obtain both the payment token and verification value at the same time.

At step S518, the token provider computer 570 may identify the token record in the token record database based on the payment token, token expiration date, token requestor ID, acquirer BIN, and/or any other suitable information in the verification value request message. The token provider computer 570 may authenticate the request, for example, by verifying that the information in the request is valid.

The token provider computer 570 may then generate a dynamic data element. The dynamic data element may be a unique hexadecimal value, a random value, an ATC, a timestamp, or any other suitable value. In some embodiments, the dynamic data element may include 5 or more digits.

The token provider computer 570 may also generate a verification value. The verification value may be generated based on the dynamic data element, the payment token, the token expiration date, the token requestor ID, an acquirer BIN, one or more cryptographic keys, and/or any other suitable information. In some embodiments, the verification value can have one or more static inputs (e.g., a payment token, an expiration date, and a token requestor ID) and one or more dynamic inputs (e.g., a unique hex value, an ATC, a timestamp, and a transaction amount). The verification value may be a unique value (e.g., as a result of being generated based on the dynamic data element). An example algorithm for generating a verification value is described above with respect to FIGS. 5-8.

The token provider computer 570 may store the dynamic data element (e.g., in a token record or a dynamic data element record). The stored dynamic data element may be associated with the payment token, token expiration date, token requestor ID, acquirer BIN, a certain timeframe, and/or any other suitable information. Some or all of this corresponding information can be used as tags for later identifying the dynamic data element. For example, the dynamic data element can be identified for validating a transaction based on transaction information (e.g., payment token, token expiration date, token requestor ID, acquirer BIN, and/or any other suitable information) received in an authorization request message.

In some embodiments, the token provider computer 570 does not store the verification value. However, token provider computer 570 may be able to re-create the verification value based on the dynamic data element, the payment token, the token expiration date, the token requestor ID, one or more cryptographic keys associated with the payment token, an acquirer BIN, and/or any other information used to generate the original verification value. In some embodiments, some or all of this information may be stored. For example, the dynamic data element can be stored as described above, and the dynamic data element can be identified and used to validate the verification value when the verification value is received during a transaction. In some embodiments, some or all of this information may not be stored, and instead the verification value can be regenerated based on information received with the payment token for a transaction. The cryptographic keys can be stored or generated based on a master derivation key.

The token provider computer 570 may also associate one or more domain controls with the verification value in order to place constraints on the use of the verification value. This can be accomplished by storing the domain controls in the token record database along with the dynamic data element (e.g., in a token record or a dynamic data element record). As a result, when the dynamic data element is identified for a transaction (as described above), the domain controls for the transaction can also be identified. In further embodiments, the domains of a current transaction (e.g., an in-person transaction at a certain merchant) can be used to identify the correct dynamic data element. Thus, domain controls associated with the verification value can be stored even when the verification value is not stored.

As an example of a domain control, the verification value may be associated with a context-specific use. This can include associating the verification value with the resource provider computer's token requestor ID and/or the transport computer's acquirer BIN, such that the verification value can only be used for a transaction when accompanied by the token requestor ID and/or the acquirer BIN. The verification value may also be associated with a limited lifespan (e.g., only valid for a certain period of time), a certain payment mode (e.g., internet-based transactions or in-person transactions), a maximum transaction amount, an actual transaction amount, and/or any other suitable token domain.

At step S520, the token provider computer 570 may send a verification value response message back to the resource provider computer 531. The verification value response message may include the verification value, the payment token, the token expiration date, and/or any other suitable information. In some embodiments, the token response message may not include the dynamic data element. In other embodiments, the token response message may not include a first dynamic data element (e.g., a unique hexadecimal value), but the token response may include a second dynamic data element (e.g., an ATC). Thus, a random value can be kept secret and stored, while an ATC can be sent to the resource provider computer 531.

At step S522, the resource provider computer 531 may generate an authorization request message for the transaction. The authorization request message may include the payment token, token expiration date, the verification value, the resource provider computer's token requestor ID, transaction information (e.g., information about selected goods or services, a transaction amount, a merchant ID), an acquirer BIN, an ATC (e.g., if received from the token provider computer 570), and/or any other suitable information.

In some embodiments, the payment information may be included in existing authorization request message fields. For example, the payment token may be placed in an existing PAN field, the verification value may be placed in an existing CVV2 field, and/or the token expiration date may be placed in an existing PAN expiration date field. Additionally, the payment token, verification value, and any other suitable information may be encrypted using any suitable encryption technique (e.g., using a public key associated with the token provider computer 570 or transaction processing computer 550).

At step S524, the resource provider computer 530 may send the authorization request message to the transport computer 540. At step S526, the transport computer 540 may forward the authorization request message to the transaction processing computer 550. The transaction processing computer 550 may then interact with the token provider computer 570 in order to detokenize the payment token.

At step S528, the transaction processing computer 550 may send a detokenization request message to the token provider computer 570. The detokenization request message may include information from the authorization request message, such as the payment token, the token expiration date, the verification value, the token requestor ID, a transaction ID, an acquirer BIN, an ATC, and/or any other suitable information.

At step S530, the token provider computer 570 may validate the verification value. For example, the token provider computer 570 may identify a token record (and/or a dynamic data element record) in the token vault based on the payment token, the token expiration date, the token requestor ID, the acquirer BIN, the ATC, and/or any other suitable information. The token record and/or the dynamic data element record may include a dynamic data element.

The token provider computer 570 may regenerate the verification value based on information found in the token record (or dynamic data element record) and/or information received in the authorization request message. For example, inputs used for generating a second verification value can include the dynamic data element from the token record, as well as the payment token, token expiration date, token requestor ID, acquirer BIN, and/or ATC from the authorization request message.

The token provider computer 570 may then compare the verification value received in the authorization request message with the newly regenerated verification value. If the two verification values match, the received verification value can be considered valid and authentically associated with the payment token.

The token provider computer 570 may also identify one or more domain controls associated with the verification value (e.g., as indicated in the token record or dynamic data element record). The token provider computer 570 may determine whether the current authorization request message violates any domain controls. For example, the token provider computer 570 can determine whether the payment token and verification value are being used within an allowed timeframe, being used for a transaction underneath a maximum threshold value, being submitted by an allowed merchant, token requestor, and/or acquirer, and otherwise check for approved usage conditions.

The token provider computer 570 may also determine whether the received ATC matches an expected value. For example, the token provider computer 570 may have stored an ATC used to generate the verification value, and the token provider computer 570 may expect to receive that same ATC in the next detokenization request associated with the payment token and/or token requestor ID.

In some embodiments, if the verification value is validated and the domain controls are met, the token provider computer 570 may proceed to detokenize the payment token. At step S532, the token provider computer 570 may identify the PAN and/or other payment credentials associated with the payment token. For example, the payment credentials may be stored in the token record.

At step S534, the token provider computer 570 can send a detokenization response message back to the transaction processing computer 550. The detokenization response message may include the payment credentials, the payment token, a transaction ID, and/or any other suitable information. The token provider computer 570 may also increase or change an ATC to the next incremental value.

At step S536, the transaction processing computer 550 can add the payment credentials to the authorization request message. In some embodiments, the transaction processing computer 550 may also remove the payment token, token expiration date, verification value, and/or any other suitable information from the authorization request message.

At step S538, the transaction processing computer 550 may forward the augmented authorization request message to the authorizing entity computer 560.

At step S540, the authorizing entity computer 560 may receive the authorization request message and determine whether the transaction is authorized. For example, the issuer computer 160 may determine whether an account associated with the payment credentials has sufficient funds, as well as perform risk analysis.

At step S542, the authorizing entity computer 560 may then send an authorization response message back to the transaction processing computer 550 that indicates whether the transaction is authorized.

At step S544, the transaction processing computer 550 may replace the PAN and other sensitive payment credentials in the authorization response message with the payment token, the token expiration date, and/or any other suitable information. In some embodiments, the transaction processing computer 550 may query the token provider computer 570 for the payment token.

At step S546, the transaction processing computer 550 may forward the authorization response message to the transport computer 540. At step S548, the transport computer 540 may forward the authorization response message to the resource provider computer 531.

At step S550, the resource provider computer 531 may release the purchased goods and/or services. Additionally, the resource provider computer 531 may inform the user device 120 that the transaction was successfully authorized. For example, the resource provider computer 531 may display a transaction success window on a website or email a transaction receipt. Settlement can happen at a later time (e.g., in a batch settlement process).

Embodiments of the invention include a number of alternatives to the above-described system and method. For example, in some embodiments, a verification value can be generated further based on transaction information. Additionally, in some embodiments, an ecommerce enabler can perform some transaction processing and token management functionality on behalf of the resource provider computer. Also, in some embodiments, entities other than the resource provider computer can request and utilize a payment token and verification value. Some of the scenarios will now be briefly described below.

As described above with respect to step S518, the verification value can be generated based on the dynamic data element, the payment token, the token expiration date, the token requestor ID, and/or any other suitable information. In further embodiments, information related to the transaction can also be used as inputs for generating the verification value. For example, at step S516, the resource provider computer 531 may add a transaction amount, information about selected goods or services, a transaction ID, and/or any other suitable information to the verification value request message. The token provider computer 570 can optionally use this additional information when generating the verification value (instead of or in addition to the above-described inputs). Additionally, token domain controls can be assigned based on this transaction information (e.g., a maximum transaction amount, a set of goods or services for which a verification value can be used, etc.).

As a result, the verification value can be linked with a specific transaction. For example, at step S530, the token provider computer 570 may regenerate the verification value further based on the transaction information (e.g., a transaction amount, information about selected goods or services, a transaction ID), which may have been sent via the authorization request message. If the same transaction information is not provided in the authorization request message, the verification value may be regenerated incorrectly.

In other embodiments, the verification value may be requested before the transaction is actually initiated. For example, the verification value request message at step S516 may be sent before the transaction is initiated at step S512. As a result, the verification value may be ready for use when the transaction is initiated, such that transaction processing can occur more quickly. In this scenario, the transaction information may not yet be available at step S518, and thus may not be used to generate the verification value.

As mentioned above, embodiments of the invention also allow for other entities to request payment tokens and verification values. In some embodiments, any entity that can request and/or use a token can also request and/or use a verification value.

For example, a user device may be able to request a payment token and/or verification value from the token provider computer. When sending a payment token request and/or token verification request, the user device may include additional information such as a digital wallet identifier, a user device identifier, and/or any other suitable information.

A user device may also be able to locally store the information and use it for transactions. A user device may be able to use a payment token and verification value for in-person transactions by transmitting the data (e.g., via NFC) to a nearby access device (e.g., a Point of Sale device) for a transaction. A user device may also be able to use a payment token and verification value for over-the-air transactions (e.g., by inputting the data into a merchant checkout webpage).

Accordingly, in some embodiments, a payment token and verification value can be requested and utilized by a number of entities. An entity that sends a token request message (or a verification value request message) may be referred to as a "first computer." Accordingly, a resource provider computer, a user device, and an ecommerce enabler computer can be considered examples of a first computer. In some embodiments, an entity that provides a payment token and/or a verification value may be referred to as a "second computer." Accordingly, the token provider computer can be considered an example of a second computer. In some embodiments, during a transaction, a separate "third computer" may request detokenization and/or token validation. A transaction processing computer can be considered an example of a third computer.

In a further embodiment, the tokenization services may be provided by the transaction processing computer, or another suitable entity. Accordingly, detokenization and validation steps in S530 and S532 can be performed by the transaction processing computer, and the messages sent in steps S528 and S534 may no longer take place.

Also, in some embodiments, other entities can query the token provider computer for detokenization. For example, instead of the transaction processing computer, the authorizing entity computer or the transport computer can send the detokenization request message at step S528.

Figure 10:
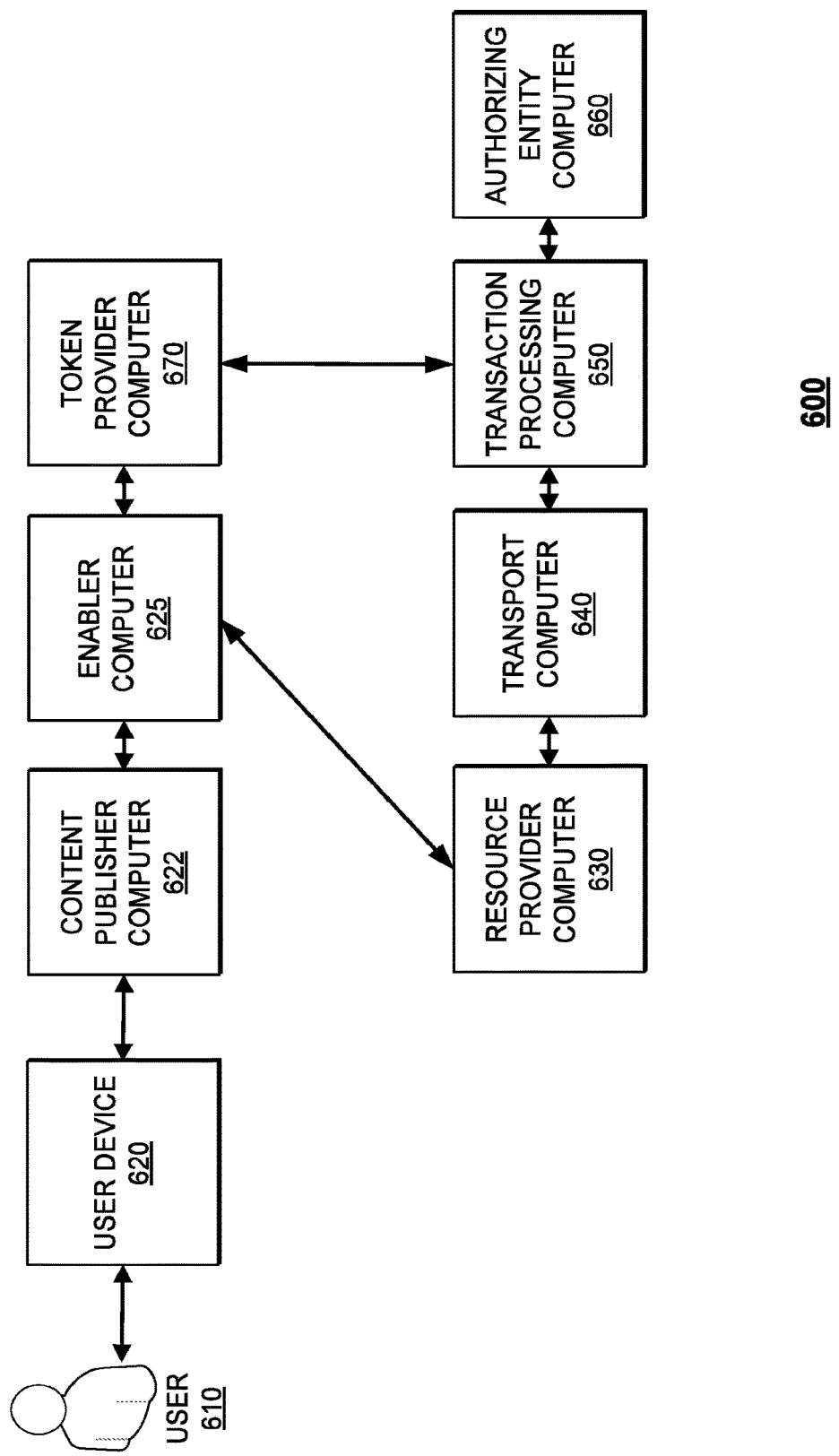
FIG. 10 shows a block diagram of an alternative system according to an embodiment of the invention.

In some embodiments, additional entities and computers may be added to the system. For example, FIG. 10 shows a block diagram of an alternative system 600 according to an embodiment of the invention. The system 600 comprises components similar to those described with respect to FIG. 1, except the system 600 also includes a content publisher computer 622 and an enabler computer 625.

In the system 600, the user 610 may select and purchase a good or service from the resource provider computer 630 through a third-party webpage (e.g., instead of a merchant website provided by the resource provider computer). For example, the resource provider's goods may be shown on a content publisher computer 622 webpage, and an enabler computer 625 may facilitate purchasing the goods directly from the listing on the content publisher computer 622 webpage (e.g., without being redirected to a resource provider webpage).

In such a scenario, a content publisher computer 622 may be associated with a website provider, mobile application provider, social network provider (e.g., TWITTER or FACEBOOK), or any other suitable entity which may provide content to the user device 620 (e.g., via a website or mobile application).

An enabler computer 625 may be associated with an ecommerce enabler that can provide transaction enabling services. For example, the enabler computer 625 may facilitate ecommerce transactions for the resource provider. Exemplary ecommerce enablers include STRIPE, BRAINTREE, and TWOTAPP. In some embodiments, the enabler computer 625 may provide internet commerce functionality to a resource provider website. In some embodiments, the enabler computer 625 may allow the resource provider to conduct ecommerce transactions through a third-party mobile application or website, such as through content published by the content publisher computer 622. For example, the resource provider computer 630 may post information about a product to a social network site (e.g., provided by the content publisher computer 622). An enabler computer 625 application or service may be integrated into content published by the content publisher computer 622 such that the user 610 can purchase the product immediately from product post, instead of being redirected to the merchant's website. For example, the user 610 may select a "buy now" icon which is hosted by the enabler computer 625 within the content publisher's content, and a purchase process may be initiated (e.g., the content publisher computer 622 may inform the enabler computer 625 that a transaction was requested).

In this scenario, the enabler computer 625 may collect a user's payment credentials, obtain a payment token from the token provider computer 670, and/or obtain a verification value associated with the payment credentials on behalf of the resource provider computer 630. The enabler computer 625 may use its own token requestor ID for requesting token information and submitting transactions, or it may use a token requestor ID associated with the resource provider computer 630. In some embodiments, the enabler computer 625 may locally store a payment token associated with the user 110 on behalf of the resource provider computer 630.

Additionally, the enabler computer 625 can submit an authorization request message to the transport computer 640 (or the resource provider computer 630) and otherwise process the transaction on behalf of the resource provider computer 630. In some embodiments, the resource provider computer 630 may have registered with the enabler computer 625 beforehand and provided information for processing the transaction (e.g., an acquirer BIN, a merchant ID, information about goods and services, etc.). Further, in other embodiments, the enabler computer 625 can provide information about the payment token, verification value, and transaction to the resource provider computer 630, and the resource provider computer 630 can then generate and submit the authorization request message.

The enabler computer 625 may also receive the authorization response message on behalf of the resource provider computer 630. The enabler computer 625 can then inform the resource provider computer 630 that goods can be released, and inform the user device 620 (e.g., via the content publisher computer 622) that the transaction was successfully authorized.

In some embodiments, the enabler computer 625 may provide information about the transaction to the resource provider computer 630, and then the resource provider computer 630 may itself submit the authorization request message for the transaction. In this scenario, the enabler computer 625 may provide information about the goods or services selected for purchase, a payment token, and/or any other suitable information. The enabler computer 625 may also request a verification value for the transaction, and then provide the verification value to the resource provider computer 630.

This can cause a conflict of token requestor IDs used with a verification value. For example, the enabler computer's token requestor ID may be used to obtain the verification value from the token provider computer 670, while the resource provider computer's token requestor ID may be submitted in an authorization request message for the transaction. In other words, the token provider computer 670 may receive a first token requestor ID during the verification value request message, and then receive a different second token requestor ID in the detokenization request message. This token requestor ID discrepancy may be grounds for rejecting the transaction.

In some embodiments, in order to allow this use-case to proceed without rejecting the transaction, the validation of a verification value may take place without using the token requestor ID. The verification value can instead be validated based on other information and domain controls (e.g., as described above). Accordingly, in some embodiments, a payment token transaction may be approved even if a second token requestor ID received with a verification value in an authorization request message does not match a first token requestor ID used to obtain the verification value.

As mentioned above, embodiments of the invention also apply to scenarios outside of payment transactions. For example, the user may have access credentials for accessing a restricted physical space (e.g., a building, venue, or event space) or restricted information (e.g., a secure online database, a personal account).

The user's access credentials can be tokenized. For example, the resource provider computer may provide access to a restricted area or secure information. The resource provider computer can interact with the token provider computer for obtaining an access token associated with the access credentials, similar to the above description of obtaining a payment token associated with payment credentials. The resource provider computer can locally store the access token associated with the user.

Then, when the user wishes to gain access, the resource provider computer can obtain a verification value to submit with the access token. The access token and verification value can be sent to the authorizing entity computer that can determine whether or not to grant access. Also, a transaction processing computer can detokenize the access token, so that the access credentials can be sent to the authorizing entity computer.

Accordingly, access credentials can similarly be protected by use of an access token, and the access token can be similarly authenticated via a verification value. Embodiments equally apply to other suitable account scenarios where account credentials of any suitable sort can be tokenized for protection.

Embodiments of the invention have a number of advantages. For example, in embodiments of the invention, a payment token can be used to replace payment credentials, thereby improving transaction security. If a payment token is stolen or otherwise compromised, it can be canceled and reissued without having to change the actual payment credentials. Also, in some embodiments, the payment token can only be used for one payment channel (e.g., one merchant), so cancelling the payment token does not interrupt transactions for other payment channels (e.g., other merchants that have different payment tokens that represent the same payment credentials).

Embodiments of the invention also advantageously provide a verification value for a transaction. In some embodiments, a payment token is not accepted unless accompanied by an authentic verification value. As a result, transaction security and token control are improved, as each transaction can be individually pre-approved, and individually verified before being authorized.

Embodiments further advantageously use a centrally-generated dynamic data element as an input when generating a verification value. In some embodiments, while the verification value is provided to a token requestor, the dynamic data element can be stored and kept secret. Further, the algorithm for generating the dynamic data element can also be kept secret, since it is stored at a secure central computer and not distributed. This can lead to a verification value that is unique and that cannot be forged. For example, a fraudster cannot guess any secret dynamic data elements stored at the token provider computer, so a fraudster cannot guess or re-create any valid verification values. If the fraudster were to use some random value (instead of an authentic dynamic data element) as an input for creating a fraudulent verification value, the fraudulent verification value would be rejected because there would not be an associated dynamic data element stored at the token provider computer. In other words, the fraudulent verification value would be not be verifiable when submitted for a transaction.

Embodiments further provide an improved verification value. Since the same entity (e.g., the token provider computer) can both generate the verification value and validate the verification, there may be no need to share a secret with any other entities. As a result, the building blocks for the verification value (e.g., dynamic data elements used as input, the generation algorithm, and/or the encryption keys) can be truly random and unpredictable. Thus, the verification value can be dynamic, random, and unpredictable.

Further, embodiments allow a verification value to be used without having to store the verification value (i.e., no need to store sensitive security information). Instead, a dynamic data element used as input for the verification value can be stored. Additionally, embodiments can decrease the amount of storage capacity needed at a central token provider. For example, instead of storing a large cryptogram or multiple encryption keys, a smaller dynamic data element can be stored, and specific keys can be derived when needed.

Embodiments of the invention can also advantageously place unique and varying domain controls on different payment tokens and verification values. Since the dynamic data element and other information associated with the verification value can be centrally stored at the token provider computer, any suitable domain controls can be linked with a specific verification value at the token provider computer. As a result, even if the verification value is not stored at the token provider computer, domain controls can still be applied to the verification value. For example, when a verification value is received for a transaction, a token record and/or dynamic data element record associated with the verification value can be identified, and the record can include domain controls associated with the verification value.

This means that a verification value cannot be used by a malicious party for an unapproved transaction, even if the verification value is compromised. For example, a fraudster may attempt to use a compromised payment token and verification value for a fraudulent transaction. However, if the transaction does not conform to the assigned domain controls (e.g., taking place at an allowed merchant or within an allowed time frame, under a certain maximum transaction amount, submitted with the correct token requestor ID, etc.), the transaction can be denied.

In some embodiments, each verification value can be generated and provided individually. Accordingly, domain controls can be tailored and assigned for each intended transaction. For example, the token provider computer can assign token domain controls based on the identity of the token requestor, the intended transaction amount (or maximum limit), the intended merchant, and/or any other suitable transaction parameters. As a result, each transaction can be individually controlled and limited.

Embodiments of the invention can also advantageously introduce these methods for controlling payment tokens through verification values and dynamic data elements without requiring the merchant computer, acquirer computer, or issuer computer to make any changes. For example, the payment token and verification value can be submitted according to normal authorization procedures. The verification value can be sent in an existing "CVV" field in an authorization request message without making any formatting or procedural changes, as the verification value can have the same format as a CVV value. In contrast, merchant and acquirer system updates would be needed in order to accommodate token cryptograms for online transactions. Token cryptograms typically are not formatted similarly to any other values that are already used (and can be omitted) during transaction processing. Additional fields would be needed for the authorization request message and for merchant checkout webpages, and additional protocols would be needed to accept and send token cryptograms.

Further, in some embodiments, a merchant (or other token requestor) may not need to make changes to support verification value generation. For example, a merchant may not have to manage a secure data storage to protect encryption keys and cryptogram-generation algorithms. Instead, verification values can be obtained from a central entity (e.g., a token provider computer).

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, by a second computer, from a first computer, a request for a verification value associated with a transaction, the request including a token;
   generating, by the second computer, a dynamic data element that is not shared with the first computer and a third computer;
   storing, by the second computer, a record including the dynamic data element and the token;
   generating, by the second computer, a first verification value based on the dynamic data element and the token wherein the first verification value is formatted as a dynamic card verification value 2 (dCVV2);

providing, by the second computer, the first verification value to the first computer;

receiving, by the second computer, from the third computer, a request to validate the first verification value, the request including the first verification value and the token;

identifying, by the second computer, the record including the dynamic data element based on the token;

generating, by the second computer, a second verification value based on the dynamic data element and the token;

determining, by the second computer, whether the second verification value matches the first verification value; and providing, by the second computer, to the third computer, a value credential associated with the token when the second verification value matches the first verification value, and not providing the value credential associated with the token when the second verification value does not match the first verification value, wherein the transaction is a payment transaction, and wherein the third computer sends the value credential to an authorizing entity computer, which authorizes the payment transaction based on the value credential.

2. The method of claim 1, wherein the dynamic data element is a timestamp, and wherein the first verification value is a dynamic value.

3. The method of claim 1, wherein the first verification value is not stored at the second computer.

4. The method of claim 1, wherein the request for the verification value further includes a token requestor identifier, wherein the stored record further includes the token requestor identifier, wherein the request to validate the first verification value further includes the token requestor identifier, and wherein the record including the dynamic data element is identified further based on the token requestor identifier.

5. The method of claim 1, wherein the token is a substitute for a primary account number.

6. The method of claim 5, wherein the second computer is a token provider computer.

7. The method of claim 6, wherein the first computer is a resource provider computer.

8. The method of claim 1, wherein the dynamic data element is a random number.

9. A second computer comprising:

a processor device; and a non-transitory computer readable medium, the non-transitory computer readable medium comprising code, executable by the processor device, for implementing a method comprising:

receiving, from a first computer, a request for a verification value associated with a transaction, the request including a token;

generating a dynamic data element that is not shared with the first computer and a third computer;

storing a record including the dynamic data element and the token;

generating a first verification value based on the dynamic data element and the token wherein the first verification value is formatted as a dynamic card verification value 2 (dCVV2);

providing the first verification value to the first computer;

receiving, from the third computer, a request to validate the first verification value, the request including the first verification value and the token;

identifying the record including the dynamic data element based on the token;

generating a second verification value based on the dynamic data element and the token;

determining whether the second verification value matches the first verification value; and providing, to the third computer, a value credential associated with the token when the second verification value matches the first verification value, and not providing the value credential associated with the token when the second verification value does not match the first verification value, wherein the transaction is a payment transaction, and wherein the third computer sends the value credential to an authorizing entity computer, which authorizes the payment transaction based on the value credential.

10. The second computer of claim 9, wherein the dynamic data element is a timestamp, and wherein the first verification value is a dynamic value.

11. The second computer of claim 9, wherein the first verification value is not stored at the second computer.

12. The second computer of claim 9, wherein the request for the verification value further includes a token requestor identifier, wherein the stored record further includes the token requestor identifier, wherein the request to validate the first verification value further includes the token requestor identifier, and wherein the record including the dynamic data element is identified further based on the token requestor identifier.

13. A method comprising:

receiving, by a third computer, from a first computer, an authorization request message for a payment transaction, the authorization request message including a token and a first verification value, wherein the first verification value is formatted as a dynamic card verification value 2 (dCVV2);

sending, by the third computer, the token and the first verification value to a second computer, wherein the second computer identifies a dynamic data element based on the token, wherein the dynamic data element is not shared by the second computer with the first computer and the third computer, wherein the second computer generates a second verification value based on the dynamic data element and the token, and wherein the second computer determines whether the second verification value matches the first verification value and provides, to the third computer, a value credential associated with the token when the second verification value matches the first verification value and does not provide the value credential associated with the token when the second verification value does not match the first verification value;

receiving, by the third computer, from the second computer, the value credential associated with the token; and sending, by the third computer, the authorization request message and the value credential to an authorizing entity computer, wherein the authorizing entity computer authorizes the payment transaction based on the value credential.

14. The method of claim 13, wherein the dynamic data element is a timestamp, and wherein the first verification value is a dynamic value.

15. The method of claim 13, wherein the first verification value is not stored at the second computer.

16. The method of claim 13, wherein the authorization request message also includes a token requestor identifier, wherein the token requestor identifier is also sent to the second computer, and wherein the second computer identifies the dynamic data element further based on the token requestor identifier.

17. A third computer comprising:
a processor device; and
a non-transitory computer readable medium, the non-transitory computer readable medium comprising code, executable by the processor device, for implementing a method comprising:
receiving, from a first computer, an authorization request message for a payment transaction, the authorization request message including a token and a first verification value, wherein the first verification value is formatted as a dynamic card verification value 2 (dCVV2);
sending the token and the first verification value to a second computer, wherein the second computer identifies a dynamic data element based on the token, wherein the dynamic data element is not shared by the second computer with the first computer and the third computer, wherein the second computer generates a second verification value based on the dynamic data element and the token, and wherein the second computer determines whether the second verification value matches the first verification value and provides, to the third computer, a value credential associated with the token when the second verification value matches the first verification value and does not provide the value credential associated with the token when the second verification value does not match the first verification value;
receiving, from the second computer, the value credential associated with the token; and
sending the authorization request message and the value credential to an authorizing entity computer, wherein the authorizing entity computer authorizes the payment transaction based on the value credential.

18. The third computer of claim 17, wherein the dynamic data element is a timestamp, and wherein the first verification value is a dynamic value.

19. The third computer of claim 17, wherein the authorization request message also includes a token requestor identifier, wherein the token requestor identifier is also sent to the second computer, and wherein the second computer identifies the dynamic data element further based on the token requestor identifier.

* * * * *